US011972360B2

(12) United States Patent
Kim et al.

(10) Patent No.: US 11,972,360 B2
(45) Date of Patent: Apr. 30, 2024

(54) UTILIZING MACHINE LEARNING MODELS TO AUTOMATICALLY GENERATE CONTEXTUAL INSIGHTS AND ACTIONS BASED ON LEGAL REGULATIONS

(71) Applicant: Accenture Global Solutions Limited, Dublin (IE)

(72) Inventors: Thomas Kim, Toronto (CA); Sungwon Youn, Toronto (CA); Hesoo Heo, Toronto (CA); Alex Robert Wong, Toronto (CA); Lisa Dickson, Carp (CA); Christopher Snow, Ottawa (CA); Carl Sharpe, Orleans (CA); Jodie K. Wallis, Toronto (CA); Natalie Heisler, Toronto (CA)

(73) Assignee: Accenture Global Solutions Limited, Dublin (IE)

(*) Notice: Subject to any disclaimer, the term of this patent is extended or adjusted under 35 U.S.C. 154(b) by 1044 days.

(21) Appl. No.: 16/536,067

(22) Filed: Aug. 8, 2019

(65) Prior Publication Data
US 2020/0090059 A1 Mar. 19, 2020

Related U.S. Application Data

(60) Provisional application No. 62/731,270, filed on Sep. 14, 2018.

(51) Int. Cl.
*G06Q 10/00* (2023.01)
*G06F 40/30* (2020.01)
(Continued)

(52) U.S. Cl.
CPC ............. *G06N 5/04* (2013.01); *G06F 40/30* (2020.01); *G06N 5/022* (2013.01); *G06N 20/00* (2019.01); *G06Q 50/18* (2013.01)

(58) Field of Classification Search
CPC .................. G06Q 50/18; G06F 40/20–58
See application file for complete search history.

(56) References Cited

U.S. PATENT DOCUMENTS 8,935,229 B1* 1/2015 Ritchey ............... G06F 16/248
707/723
9,519,707 B2* 12/2016 Kemp ............... G06F 16/9535
(Continued)

OTHER PUBLICATIONS

Shuang Hao, Chengliang Chai, Guoliang Li, Nan Tang, Ning Wang, and Xiang Yu. Outdated fact detection in knowledge bases. In 2020 IEEE 36th International Conference on Data Engineering (ICDE), pp. 1890-1893. IEEE, 2020. (Year: 2020).*

*Primary Examiner* — Rutao Wu
*Assistant Examiner* — Scott M Ross
(74) *Attorney, Agent, or Firm* — Harrity & Harrity, LLP

(57) ABSTRACT

A device may receive input data associated with a legal regulation, and may process the input data to generate a record that includes: the input data in a knowledge representation format and a semantic representation format, data identifying a feature, data identifying an industry classification, or data identifying an entity of interest. The device may process the record, with machine learning models, to determine output data that includes: data indicating that the legal regulation is inconsistent, data indicating that the legal regulation is outdated, data indicating a sentiment for the legal regulation, data indicating a prescriptive nature of the legal regulation, data indicating a complexity of the legal regulation, data indicating a misrepresentation in the legal regulation, data indicating a compliance burden associated with the legal regulation, or data indicating an industry performance impact of the legal regulation. The device may perform actions based on the output data.

20 Claims, 24 Drawing Sheets

(51) Int. Cl.
*G06N 5/022* (2023.01)
*G06N 5/04* (2023.01)
*G06N 20/00* (2019.01)
*G06Q 50/18* (2012.01)

(56) References Cited

U.S. PATENT DOCUMENTS

| | | |
|---|---|---|
| 9,811,518 B2 | 11/2017 | Leidner et al. |
| 10,452,734 B1* | 10/2019 | Merrill ............... G06Q 10/0637 |
| 10,846,472 B2* | 11/2020 | Postniece ............... G06F 16/313 |
| 11,226,720 B1* | 1/2022 | Vandivere ................ G06N 7/01 |
| 11,361,151 B1* | 6/2022 | Guberman ............... G06N 3/08 |
| 2007/0130100 A1* | 6/2007 | Miller ..................... G06F 16/94 |
| 2007/0255686 A1* | 11/2007 | Kemp ................. G06F 16/9535 |
| 2010/0332520 A1* | 12/2010 | Lu ..................... G06F 16/24578 |
| | | 707/769 |
| 2011/0055206 A1* | 3/2011 | Martin ................. G06F 40/289 |
| | | 707/723 |
| 2013/0085745 A1* | 4/2013 | Koister ................... G06F 40/30 |
| | | 704/9 |
| 2014/0258301 A1* | 9/2014 | Misra ..................... G06F 16/36 |
| | | 707/739 |
| 2015/0012448 A1* | 1/2015 | Bleiweiss ............... G06Q 50/18 |
| | | 705/311 |
| 2016/0042061 A1* | 2/2016 | Sengupta ................ G06F 40/30 |
| | | 707/738 |
| 2016/0188568 A1* | 6/2016 | Srinivasan .............. G06F 40/30 |
| | | 704/9 |
| 2017/0192958 A1* | 7/2017 | Misra ..................... G06F 40/30 |
| 2018/0232827 A1 | 8/2018 | Badenes et al. |
| 2018/0357511 A1* | 12/2018 | Misra .................... G06N 20/10 |
| 2020/0050620 A1* | 2/2020 | Clark ................. G06F 16/24578 |
| 2020/0050660 A1* | 2/2020 | Postniece ............... G06Q 50/18 |
| 2020/0090059 A1* | 3/2020 | Kim ..................... G06F 40/205 |
| 2020/0111023 A1* | 4/2020 | Pondicherry Murugappan ......... G06F 40/295 |
| 2020/0327151 A1* | 10/2020 | Coquard ............ G06F 16/3347 |

\* cited by examiner

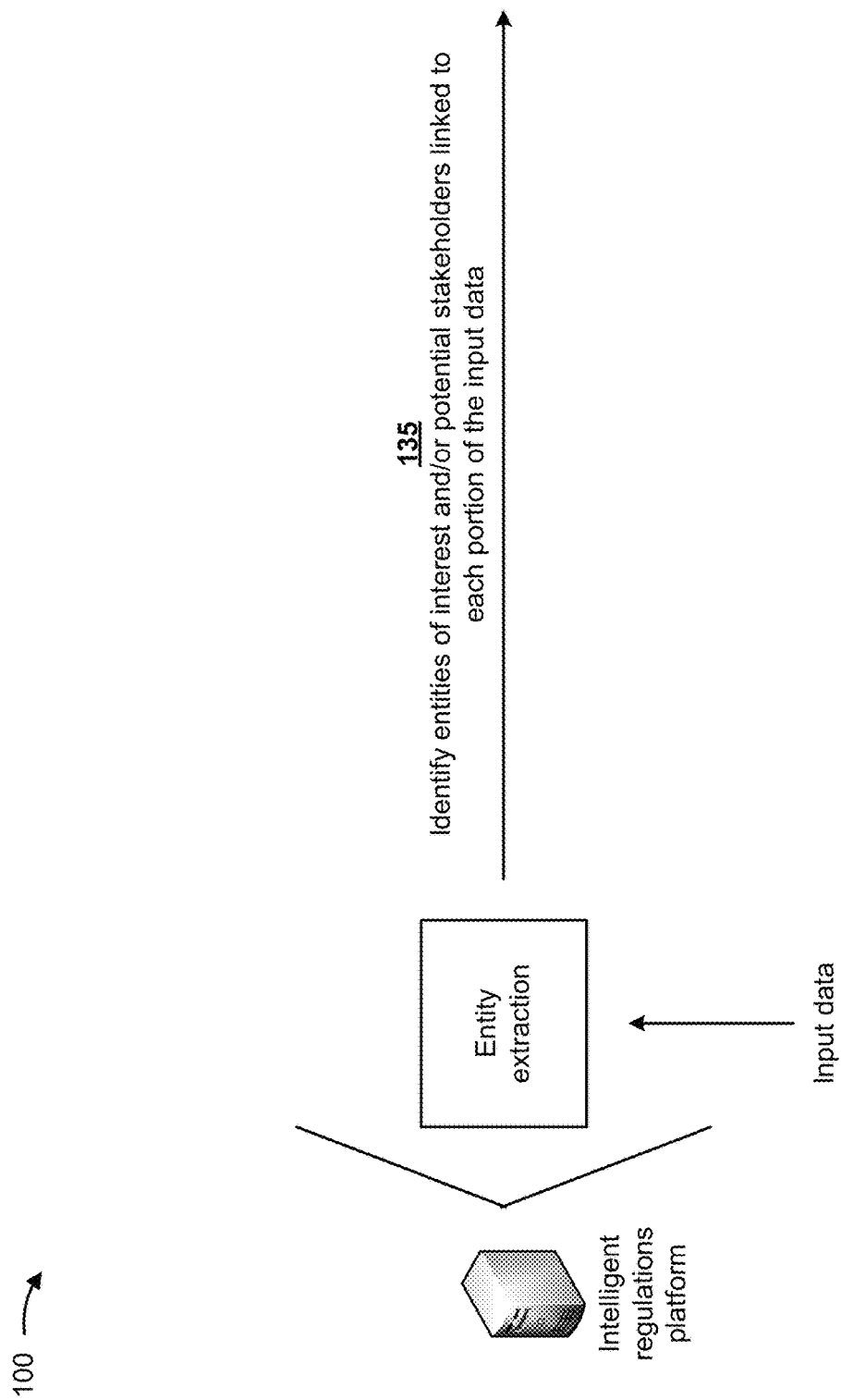

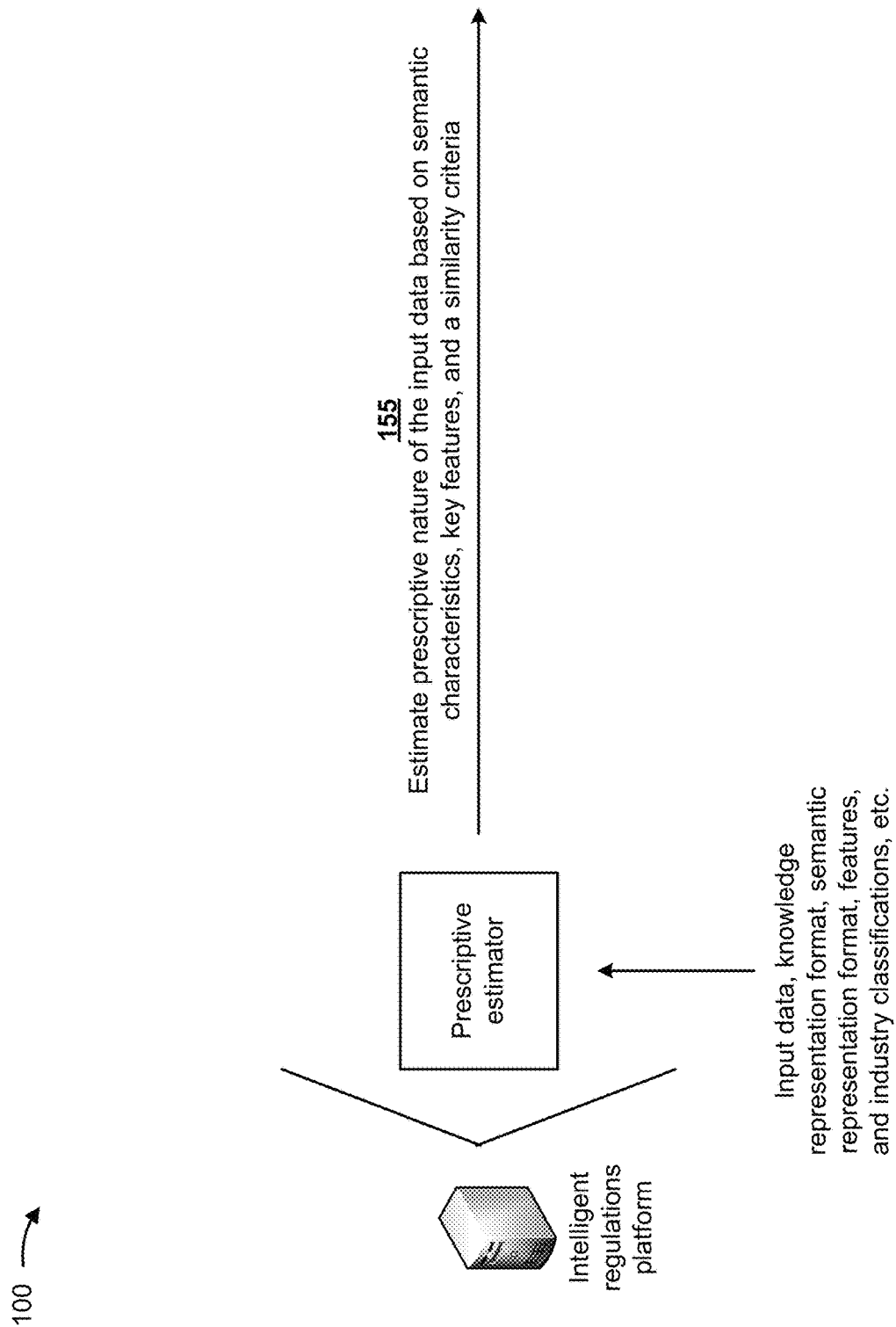

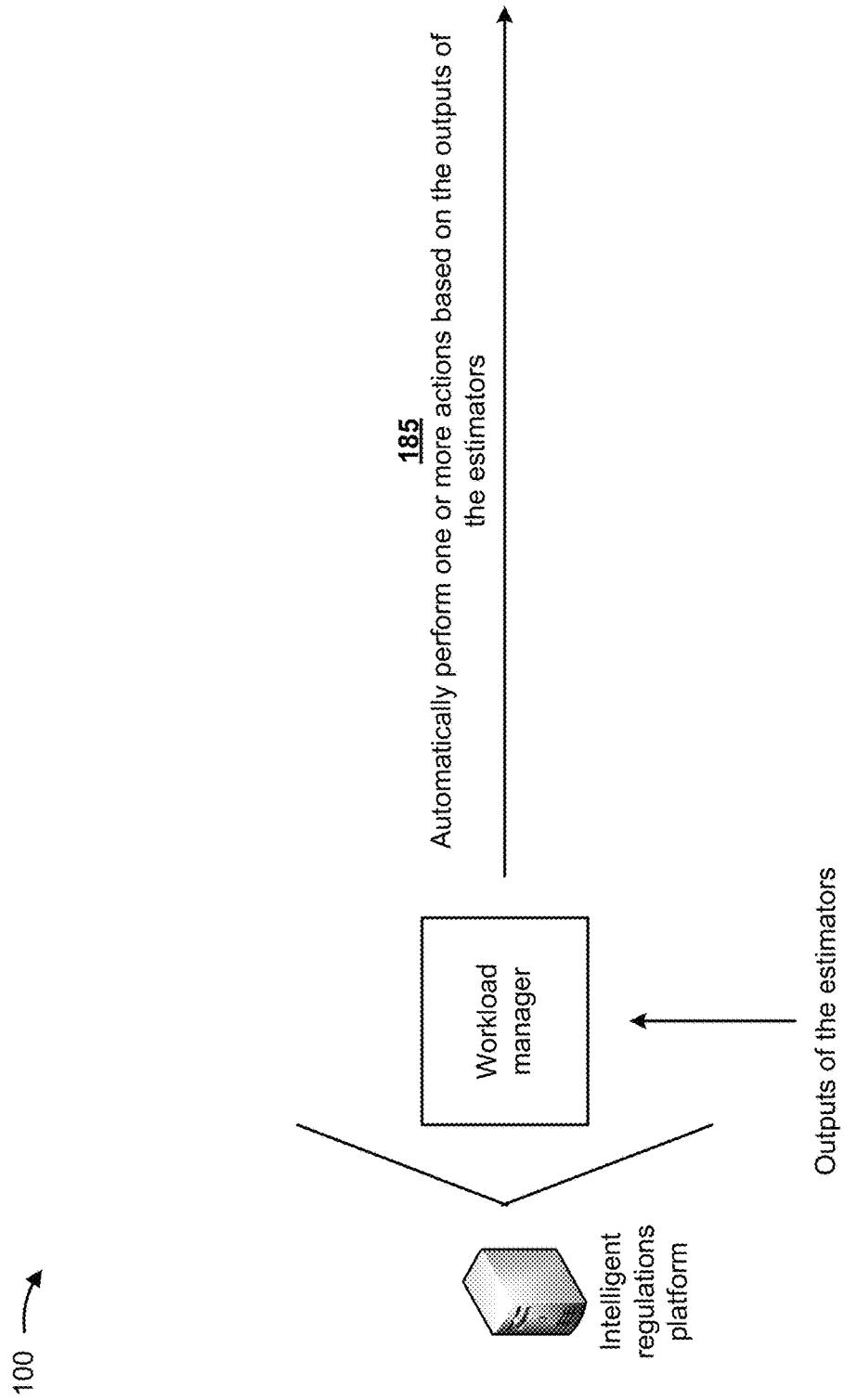

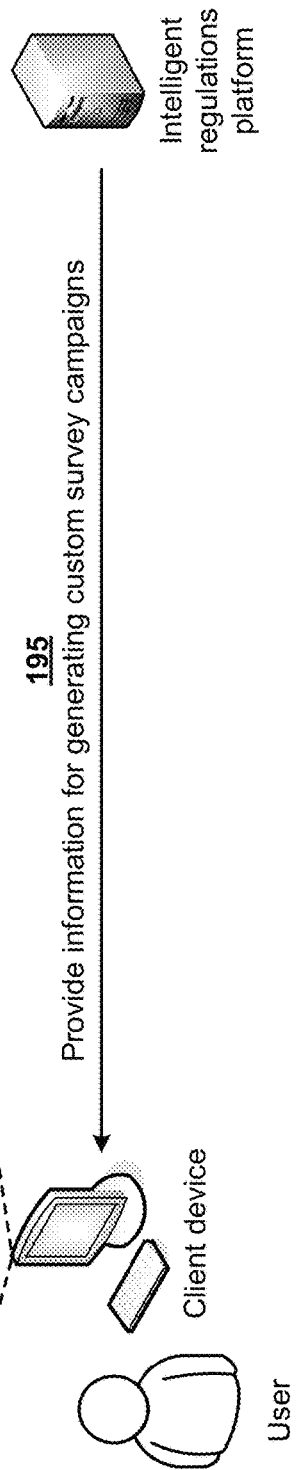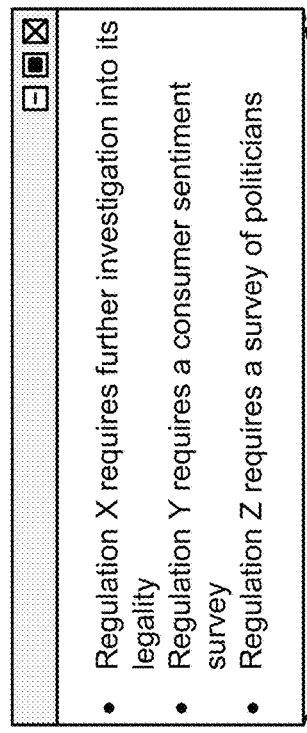
FIG. 1S

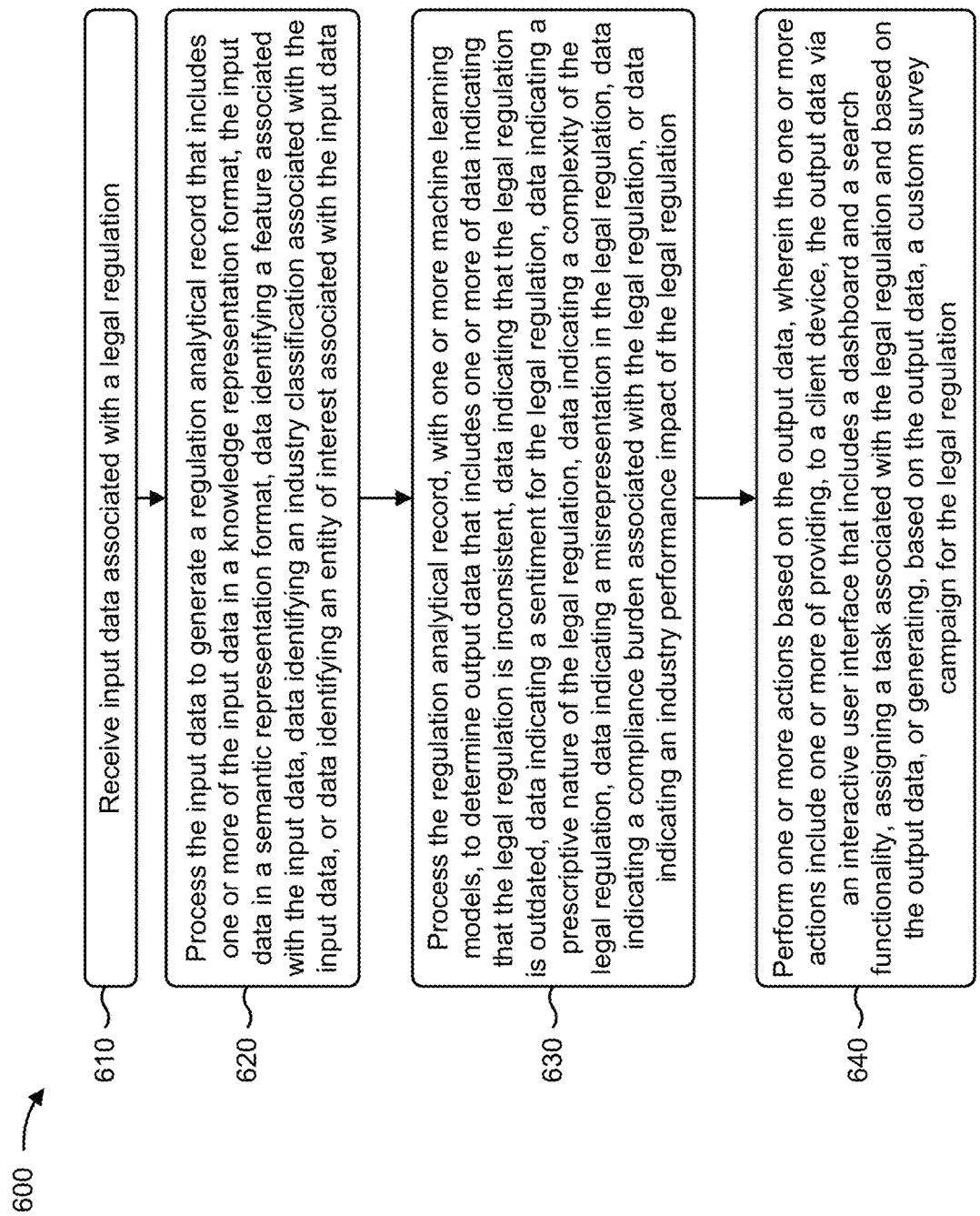

UTILIZING MACHINE LEARNING MODELS TO AUTOMATICALLY GENERATE CONTEXTUAL INSIGHTS AND ACTIONS BASED ON LEGAL REGULATIONS

RELATED APPLICATION

This application claims priority under 35 U.S.C. § 119 to U.S. Provisional Patent Application No. 62/731,270, filed on Sep. 14, 2018, and entitled "UTILIZING MACHINE LEARNING MODELS TO AUTOMATICALLY GENERATE CONTEXTUAL INSIGHTS AND ACTIONS BASED ON LEGAL REGULATIONS," the content of which is incorporated by reference herein in its entirety.

BACKGROUND

Every year, thousands of hours and resources (e.g., computing resources, network resources, and/or the like) are devoted by entities (e.g., individuals, companies, government agencies, and/or the like) to understanding complex legal regulations. Legal regulations are typically written in legal languages that are difficult to understand, at best, and incomprehensible at worst. Thus, a vast majority of people, even people with university-level educations, have enormous difficulties understanding the language of complex legal regulations.

SUMMARY

According to some implementations, a method may include receiving input data associated with a legal regulation, and processing the input data to generate a record that includes one or more of the input data in a knowledge representation format, the input data in a semantic representation format, data identifying a feature associated with the input data, data identifying an industry classification associated with the input data, or data identifying an entity of interest associated with the input data. The method may include processing the record, with one or more machine learning models, to determine output data that includes one or more of data indicating that the legal regulation is inconsistent, data indicating that the legal regulation is outdated, data indicating a sentiment for the legal regulation, data indicating a prescriptive nature of the legal regulation, data indicating a complexity of the legal regulation, data indicating a misrepresentation in the legal regulation, data indicating a compliance burden associated with the legal regulation, or data indicating an industry performance impact of the legal regulation. The method may include performing one or more actions based on the output data.

According to some implementations, a device may include one or more memories, and one or more processors, communicatively coupled to the one or more memories, to receive input data associated with a legal regulation, and format the input data, with one or more natural language processing techniques, to generate formatted input data. The one or more processors may process the formatted input data to generate a record that includes one or more of the input data in a knowledge representation format, the input data in a semantic representation format, data identifying a feature associated with the input data, data identifying an industry classification associated with the input data, or data identifying an entity of interest associated with the input data. The one or more processors may process the record, with one or more machine learning models, to determine output data that includes one or more of data indicating that the legal regulation is inconsistent, data indicating that the legal regulation is outdated, data indicating a sentiment for the legal regulation, data indicating a prescriptive nature of the legal regulation, data indicating a complexity of the legal regulation, data indicating a misrepresentation in the legal regulation, data indicating a compliance burden associated with the legal regulation, or data indicating an industry performance impact of the legal regulation. The one or more processors may perform one or more actions based on the output data.

According to some implementations, a non-transitory computer-readable medium may store one or more instructions that, when executed by one or more processors of a device, may cause the one or more processors to receive input data associated with a legal regulation, and process the input data to generate a regulation analytical record that includes one or more of the input data in a knowledge representation format, the input data in a semantic representation format, data identifying a feature associated with the input data, data identifying an industry classification associated with the input data, or data identifying an entity of interest associated with the input data. The one or more instructions may cause the one or more processors to process the regulation analytical record, with one or more machine learning models, to determine output data that includes one or more of data indicating that the legal regulation is inconsistent, data indicating that the legal regulation is outdated, data indicating a sentiment for the legal regulation, data indicating a prescriptive nature of the legal regulation, data indicating a complexity of the legal regulation, data indicating a misrepresentation in the legal regulation, data indicating a compliance burden associated with the legal regulation, or data indicating an industry performance impact of the legal regulation. The one or more instructions may cause the one or more processors to perform one or more actions based on the output data, wherein the one or more actions include one or more of providing, to a client device, the output data via an interactive user interface that includes a dashboard and a search functionality, assigning a task associated with the legal regulation and based on the output data, or generating, based on the output data, a custom survey campaign for the legal regulation.

BRIEF DESCRIPTION OF THE DRAWINGS

FIGS. 4-6 are flow charts of example processes for utilizing machine learning models to automatically generate contextual insights and actions based on legal regulations.

DETAILED DESCRIPTION

Figure 1A:
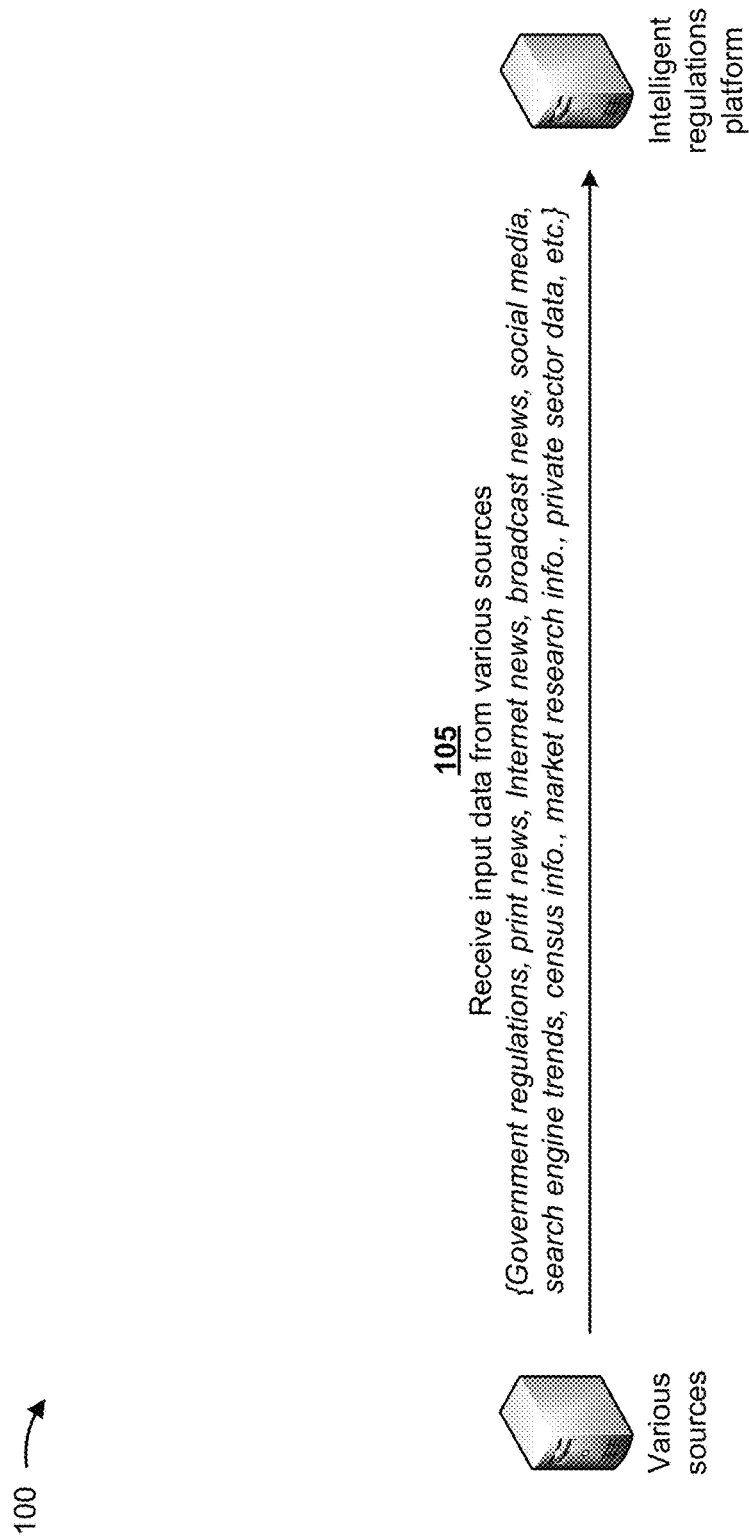
FIGS. 1A-1S are diagrams of one or more example implementations described herein.

The following detailed description of example implementations refers to the accompanying drawings. The same reference numbers in different drawings may identify the same or similar elements.

Since legal regulations are typically written in legal languages that are difficult to understand and/or incomprehensible, entities expend vast computing resources (e.g., processing resources, memory resources, and/or the like), network resources, and/or the like attempting to interpret and understand legal regulations. Such entities also expend vast computing resources, network resources, and/or the like attempting to formulate actions for handling such legal regulations. Interpreting legal regulations and formulating actions for handling legal regulations may require analyzing millions, billions, or more data points for thousands, millions, or more legal regulations. This results in poor management of computing resource usage and/or mis-allocation of computing resources, thereby wasting computing resources that could otherwise be allocated to other tasks.

Some implementations described herein provide an intelligent regulations platform that utilizes machine learning models to automatically generate contextual insights and actions based on legal regulations. For example, the intelligent regulations platform may receive input data associated with a legal regulation, and may process the input data to generate a record that includes the input data in a knowledge representation format, the input data in a semantic representation format, data identifying a feature associated with the input data, data identifying an industry classification associated with the input data, data identifying an entity of interest associated with the input data, and/or the like. The intelligent regulations platform may process the record, with one or more machine learning models, to determine output data that includes data indicating that the legal regulation is inconsistent, data indicating that the legal regulation is outdated, data indicating a sentiment for the legal regulation, data indicating a prescriptive nature of the legal regulation, data indicating a complexity of the legal regulation, data indicating a misrepresentation in the legal regulation, data indicating a compliance burden associated with the legal regulation, data indicating an industry performance impact of the legal regulation, and/or the like. The intelligent regulations platform may perform one or more actions based on the output data.

In this way, the intelligent regulations platform facilitates improved management of resources (e.g., processing resources, memory resources, network resources, and/or the like) associated with interpreting legal regulations and formulating actions for handling legal regulations. This reduces or eliminates over usage of the resources for handling legal regulations, thereby conserving the resources. In addition, this reduces or eliminates over allocation of resources for handling legal regulations, thereby reducing instances of idle or unused resources and improving a utilization efficiency of the resources for tasks other than handling legal regulations.

FIGS. 1A-1S are diagrams of one or more example implementations 100 described herein. As shown in FIG. 1A, various sources may be associated with an intelligent regulations platform. In some implementations, the various sources may include government websites, government databases, social media websites, news sources, and/or the like.

As further shown in FIG. 1A, and by reference number 105, the intelligent regulations platform may receive input data from the various sources. The input data may include data identifying government or legal regulations (e.g., federal, state, and local regulations); print news, Internet news, broadcast news, social media data, search engine trend data, census data, market research data, private sector data, policy data, and/or the like identifying legal regulations (e.g., also referred to herein as regulations); and/or the like. In some implementations, the intelligent regulations platform may receive the input data via an application programming interface (API), a web crawl application, a web scraping application, and/or the like.

In some implementations, the intelligent regulations platform may continuously receive the input data from the various sources, may periodically receive the input data from the various sources, and/or the like. The intelligent regulations platform may store the input data in a data structure (e.g., a database, a table, a list, and/or the like) associated with the intelligent regulations platform. In some implementations, there may be hundreds, thousands, millions, and/or the like, of sources that produce thousands, millions, billions, and/or the like, of data points provided in the input data. In this way, the analytical platform may handle thousands, millions, billions, and/or the like, of data points within a period of time (e.g., daily, weekly, monthly), and thus may provide "big data" capability.

Figure 1B:
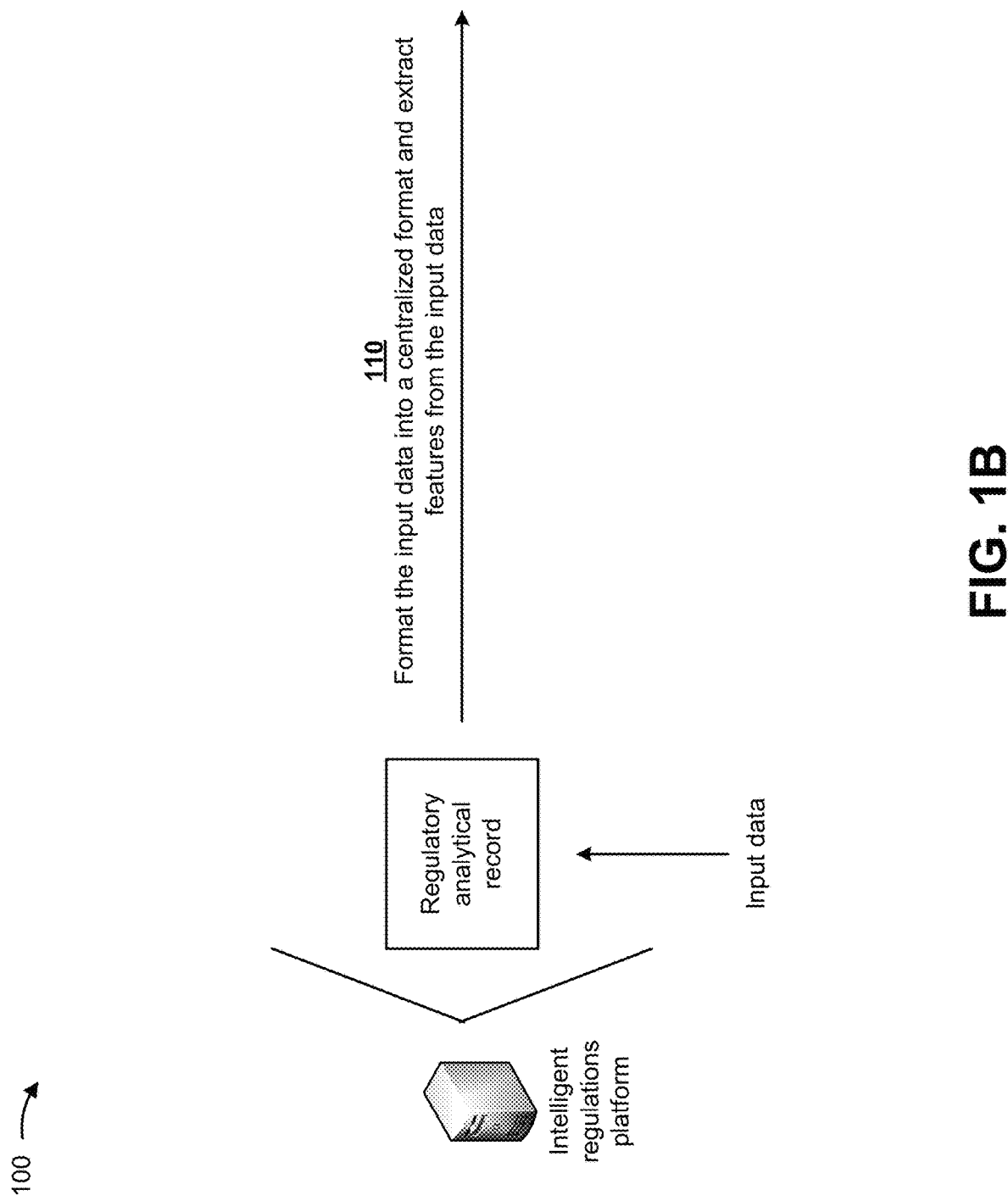

As shown in FIG. 1B, and by reference number 110, the intelligent regulations platform may format the input data into a centralized format and may extract features from the input data. For example, the intelligent regulations platform may format structured and unstructured input data into a centralized format, such that estimators generated by the intelligent regulations platform (e.g., as described below) may utilize the input data with advanced models for estimation. The intelligent regulations platform may utilize a variety of natural language processing techniques to format the input data into the centralized format, such as a segmentation technique (e.g., that divides written text into meaningful units, such as words, sentences, or topics), a word stemming technique (e.g., that reduces inflectional forms and derivationally related forms of a word to a common base form), a stop word removal technique (e.g., that filters stop words, such as "the," "is," "are," etc.), a negative term technique (e.g., that identifies negative terms in text), a consolidation technique (e.g., that combines text into meaningful units), and/or the like.

In some implementations, the intelligent regulations platform may extract features from and generate semantic representations for the input data, and may consolidate the features and the sematic representations in a data structure (e.g., a database, a table, a list, and/or the like) associated with the intelligent regulations platform. The intelligent regulations platform may include advanced models that extract key information for the estimators. In some implementations, the intelligent regulations platform may utilize the centralized format of the input data, the features, and/or the semantic representations to generate a summary for a regulation, transform keywords and phrases in order to understand contextual knowledge beyond a knowledge representation, refine knowledge and semantic representations from a statistical perspective, classify each regulation through statistical linguistic analysis, and/or the like.

Figure 1C:
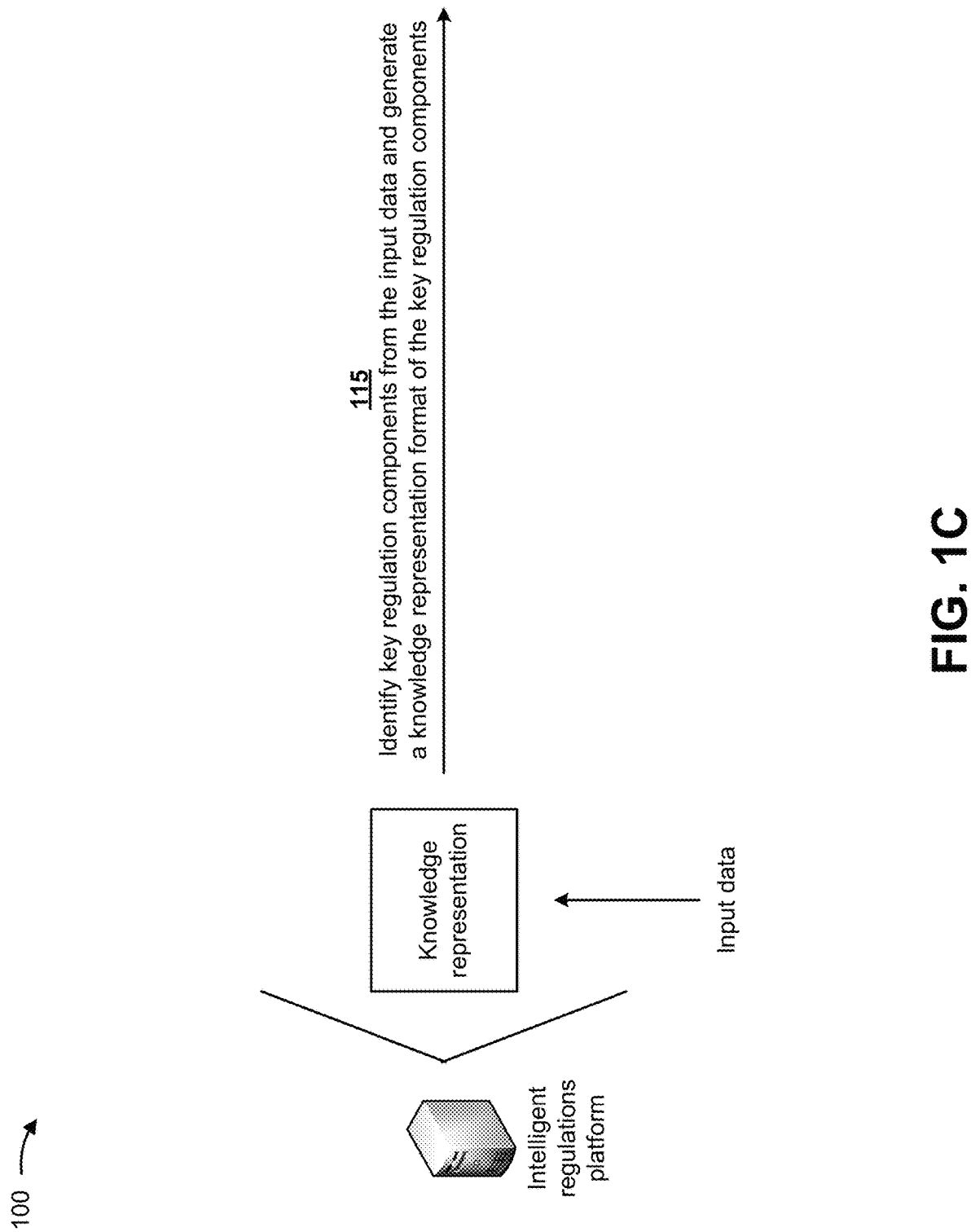

As shown in FIG. 1C, and by reference number 115, the intelligent regulations platform may identify key regulation components from the input data and may generate a knowledge representation format of the key regulation components. The key regulation components may include input data that describes a topic or subject of a regulation, and the knowledge representation format may include a combination (e.g., a summary) of the key regulation components.

For example, a regulation in free-form text may include information identifying an instrumentation number, a registration date, a consolidation date, a last modified date, an enabling authority, prescriptions, a short title, a long title, a body, a schedule, declarations, applications, an interpretation, a regulation maker, a regulation order number, a regulation maker date, privileges, immunities, exceptions, and/or the like. In some implementations, the intelligent regulations platform may identify such information (e.g., topics and/or subjects) in the regulation, may divide the information into pieces of information that are easily understandable (e.g., summaries in a semi-structured form), and/or the like. In some implementations, the intelligent regulations platform may identify, from a regulation, and via advanced statistical linguistics, actionable obligations required by parties identified in the regulation.

Figure 1D:
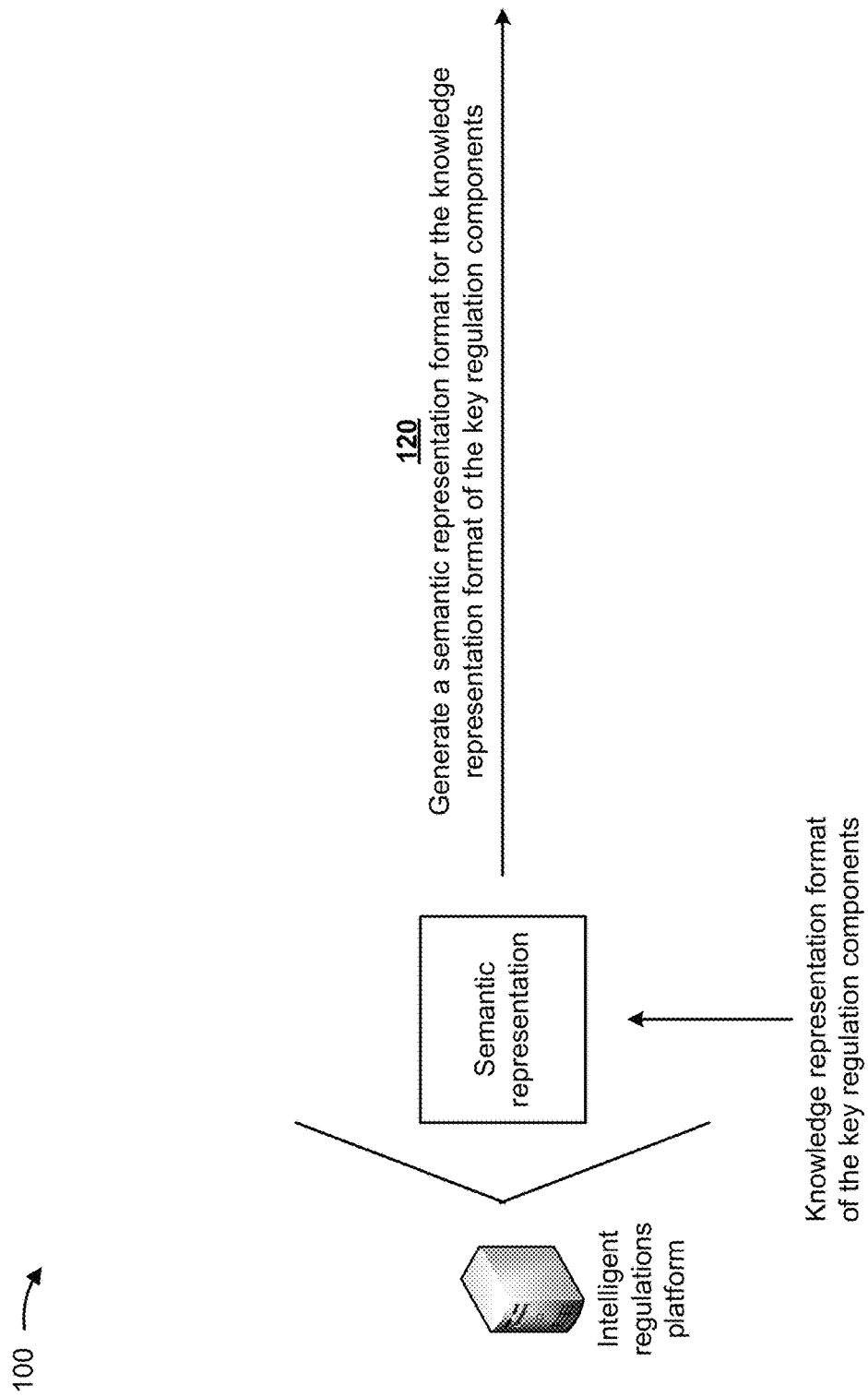

As shown in FIG. 1D, and by reference number 120, the intelligent regulations platform may generate a semantic representation format for the knowledge representation format of the key regulation components. Once the input data is provided in the knowledge representation format, the input data may be further divided for the estimators to easily digest the input data and conduct further analyses. In some implementations, the intelligent regulations platform may further divide free-form text, for each section of the knowledge representation format, into linguistical forms. For example, the intelligent regulations platform may break down sentences to a grammatical form (e.g., subject versus predicate, noun versus verb), may break down words into root forms (e.g., remove a prefix, a suffix), may remove stop words (e.g., a, the), may combine negative forms (e.g., use of not, un), may identify synonyms of keywords, may identify common metaphor definitions and proverbs, and/or the like.

Figure 1E:
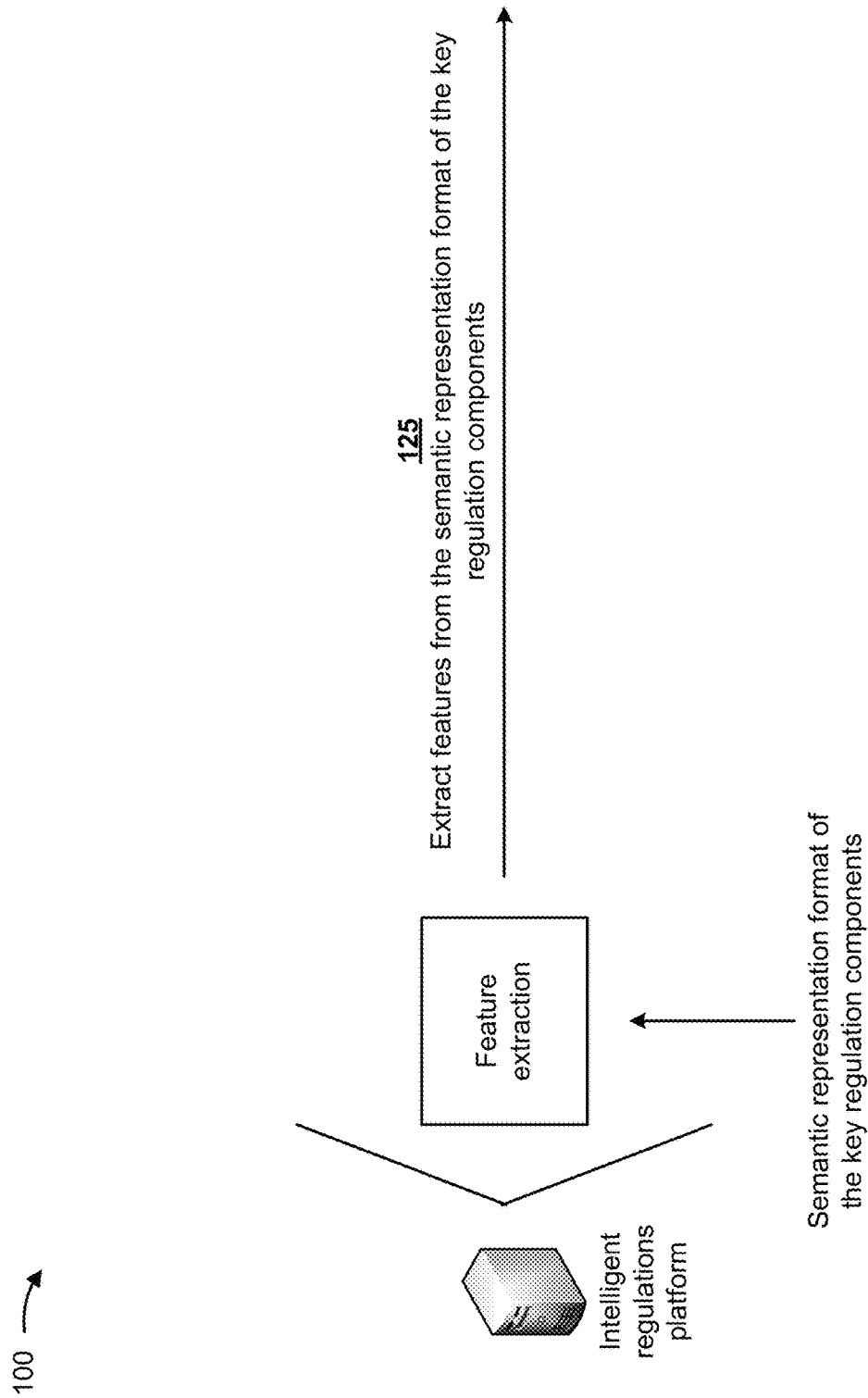

As shown in FIG. 1E, and by reference number 125, the intelligent regulations platform may extract features from the semantic representation format of the key regulation components. Once the input data is provided in the semantic representation format, the input data may need to be further refined so that the estimators can directly digest the input data and output an estimation. In some implementations, the intelligent regulations platform may assign weights per word or phrases in general; may assign weights per word or phrases for each different section of the knowledge representation format; may assign weights per word or phrases for each different estimator; may group words and phrases that are statistically similar for different estimators; may assign cannibalism and/or complementation weighting factors per words, phrases, group of words and/or phrases, etc.; and/or the like.

Figure 1F:
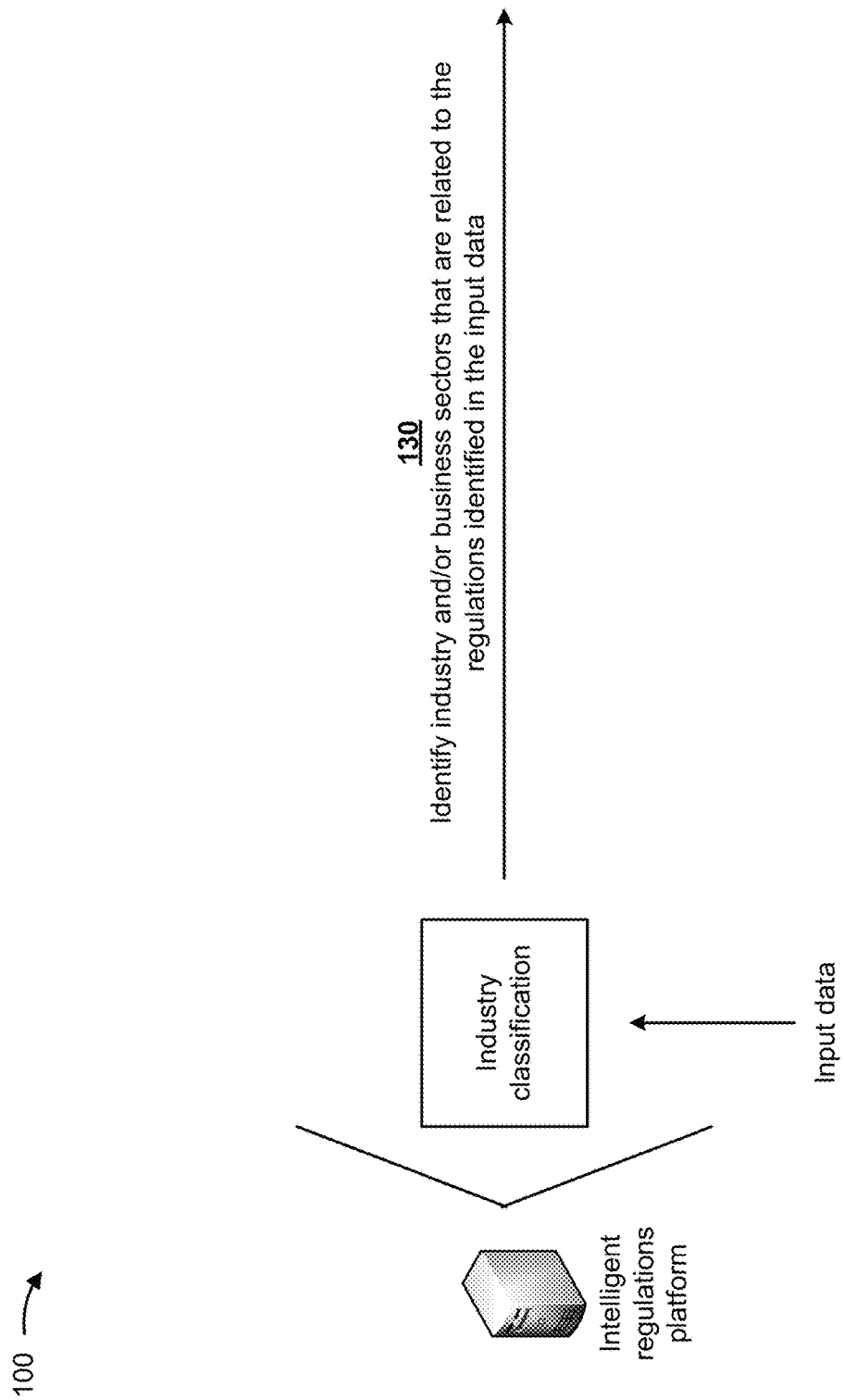

As shown in FIG. 1F, and by reference number 130, the intelligent regulations platform may identify industry and/or business sectors that are related to the regulations identified in the input data. In some implementations, the intelligent regulations platform may identify the industry and/or business sectors that are related to the regulations based on the input data, the input data in the knowledge representation format, the input data in the semantic representation format, data identifying the features, and/or the like. Currently, it is difficult for regulators, enforcers, and abiders to understand linkages between regulations and industry and/or business sectors. While human effort could be employed to read every regulation and manually assign the regulations to one or more sectors identified in the North America Industry Classification System (NAICS) (e.g., which includes multiple different sectors and industries), such a process would be time consuming, tedious, and prone to human error.

In some implementations, the intelligent regulations platform may include a flexible and scalable machine learning model that reads and processes the regulations and NAICS sector data, and maps regulations to one or more NAICS sectors based on semantic similarity scores. The machine learning model may permit regulators, enforcers, and abiders to quickly search for a specific set of regulations that pertain to a business sector, or vice versa. In some implementations, once the input data is in the feature extraction format, NAICS codes may be assigned to the regulations. In some implementations, the machine learning model may include a constant feedback loop to enhance accuracy of the machine learning model. With the input data provided in the feature extraction format, the intelligent regulations platform may identify a similarity index for a regulation, and may assign one or more NAICS codes to the regulation when the similarity index satisfies a threshold.

In some implementations, the intelligent regulations platform may train the machine learning model, with historical data (e.g., historical input data in the feature extraction format). For example, the intelligent regulations platform may separate the historical data into a training set, a validation set, a test set, and/or the like. The training set may be utilized to train the machine learning model. The validation set may be utilized to validate results of the trained machine learning model. The test set may be utilized to test operation of the machine learning model.

In some implementations, the intelligent regulations platform may train the machine learning model using, for example, an unsupervised training procedure and based on the historical data. For example, the intelligent regulations platform may perform dimensionality reduction to reduce the historical data to a minimum feature set, thereby reducing resources (e.g., processing resources, memory resources, and/or the like) to train the machine learning model, and may apply a classification technique to the minimum feature set.

In some implementations, the intelligent regulations platform may use a logistic regression classification technique to determine a categorical outcome (e.g., that the historical data can be related to industry and/or business sectors). Additionally, or alternatively, the intelligent regulations platform may use a naïve Bayesian classifier technique. In this case, the intelligent regulations platform may perform binary recursive partitioning to split the historical data into partitions and/or branches and use the partitions and/or branches to determine outcomes (e.g., that the historical data can be related to industry and/or business sectors). Based on using recursive partitioning, the intelligent regulations platform may reduce utilization of computing resources relative to manual, linear sorting and analysis of data points, thereby enabling use of thousands, millions, or billions of data points to train the machine learning model, which may result in a more accurate model than using fewer data points.

Additionally, or alternatively, the intelligent regulations platform may use a support vector machine (SVM) classifier technique to generate a non-linear boundary between data points in the training set. In this case, the non-linear boundary is used to classify test data into a particular class.

Additionally, or alternatively, the intelligent regulations platform may train the machine learning model using a supervised training procedure that includes receiving input to the machine learning model from a subject matter expert, which may reduce an amount of time, an amount of processing resources, and/or the like to train the machine learning model relative to an unsupervised training procedure. In some implementations, the intelligent regulations platform may use one or more other model training techniques, such as a neural network technique, a latent semantic indexing technique, and/or the like. For example, the intelligent regulations platform may perform an artificial neural network processing technique (e.g., using a two-layer feedforward neural network architecture, a three-layer feedforward neural network architecture, and/or the like) to perform pattern recognition with regard to patterns of the historical data. In this case, using the artificial neural network processing technique may improve an accuracy of the trained machine learning model generated by the intelligent regulations platform by being more robust to noisy, imprecise, or incomplete data, and by enabling the intelligent regulations platform to detect patterns and/or trends undetectable to human analysts or systems using less complex techniques.

As shown in FIG. 1G, and by reference number 135, the intelligent regulations platform may identify entities of interest and/or potential stakeholders linked to each portion of the input data. In some implementations, the intelligent regulations platform may identify the entities of interest and/or the potential stakeholders based on the input data, the input data in the knowledge representation format, the input data in the semantic representation format, data identifying the features, data identifying the industry classifications, and/or the like. The entities of interest and/or the potential stakeholders may include individuals of an entity, divisions of an entity, business units of an entity, companies of an entity, and/or the like that may be affected by each portion of the input data (e.g., the legal regulations).

Figure 1H:
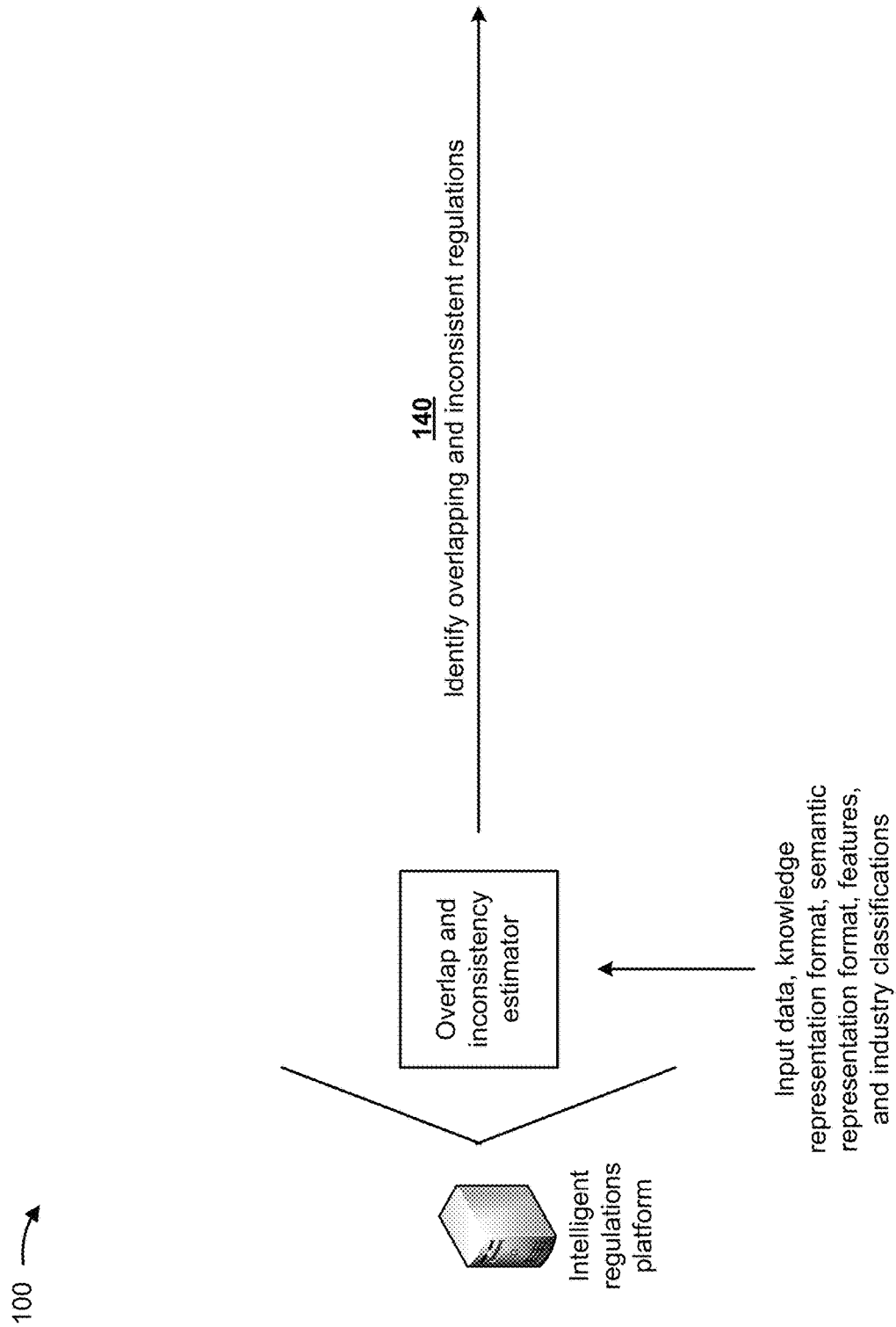

As shown in FIG. 1H, and by reference number 140, the intelligent regulations platform may identify overlapping and/or inconsistent regulations based on the input data, the input data in the knowledge representation format, the input data in the semantic representation format, data identifying the features, data identifying the industry classifications, data identifying the entities of interest and/or the potential stakeholders, and/or the like. In some implementations, the input data, the input data in the knowledge representation format, the input data in the semantic representation format, data identifying the features, data identifying the industry classifications, data identifying the entities of interest and/or the potential stakeholders, and/or the like may be referred to as a regulatory analytical record for a legal regulation associated with the aforementioned data.

In some implementations, the intelligent regulations platform may utilize multiple unsupervised machine learning models, stacked together and trained as described above in connection with FIG. 1F, to derive meaningful insights, enable a top-down analysis, and provide a drill-down comparison. The intelligent regulations platform may provide cluster outputs that represent prioritized groups of highly similar regulations compared to regulations which were not assigned to a cluster. The unsupervised machine learning models may include a latent semantic indexing (LSI) model with a predetermined threshold to enable the refinement of regulations for clustering (e.g., greater than 0.9), a further refined LSI model with a predetermined threshold (e.g., greater than 0.95), a density-based spatial clustering of applications with noise (DBSCAN) model, and/or the like.

The LSI model (e.g., with a predetermined threshold greater than 0.9) may apply term frequency-inverted document frequency (TF-IDF) weighting to a cleaned regulation-term matrix, and may apply a singular value decomposition (SVD) and rank lowering to the weighted regulation-term matrix to reduce the weighted regulation-term matrix dimensionality and transform the weighted regulation-term matrix into a regulation-concept matrix. The LSI model may calculate a cosine similarity by dot-product multiplication of the transformed regulation-concept matrix and a transpose of the transformed regulation-concept matrix.

The further refined LSI model (e.g., with a predetermined threshold greater than 0.95) may utilize TF-IDF to normalize lengths of regulations, and may replace raw word counts with a weighted value to reflect frequency of a term appearing in the regulation versus the term's frequency of occurrence in other regulations. The further refined LSI model may adjust for varying lengths of regulations and unique terms that appear infrequently in specific regulations. The further refined LSI model may apply an SVD and rank lowering to transform the high dimensional document-term matrix to a pre-defined lower dimensional space (k-value), which may be a close approximation of the original document-term matrix. The further refined LSI model may reduce the dimensionality via the SVD (e.g., which combines terms with similar co-occurrences), and may identify latent relationships and contextual-usage of individual terms. The further refined LSI model may calculate a cosine similarity to quantify a similarity between regulations using vector representations of the regulations. This similarity measure may account for document length and a frequency of each term observed in a document.

The DBSCAN model may include a density-based clustering model and may not require a quantity of clusters to be known in advance or specified. For models that do require the quantity of clusters to be specified. The DBSCAN model may provide interpretable results based on the quantity and size of clusters, regulation-labels contained in each cluster, ability to identify outliers, and/or the like. The DBSCAN model may specify a minimum cluster size and epsilon.

Figure 1I:
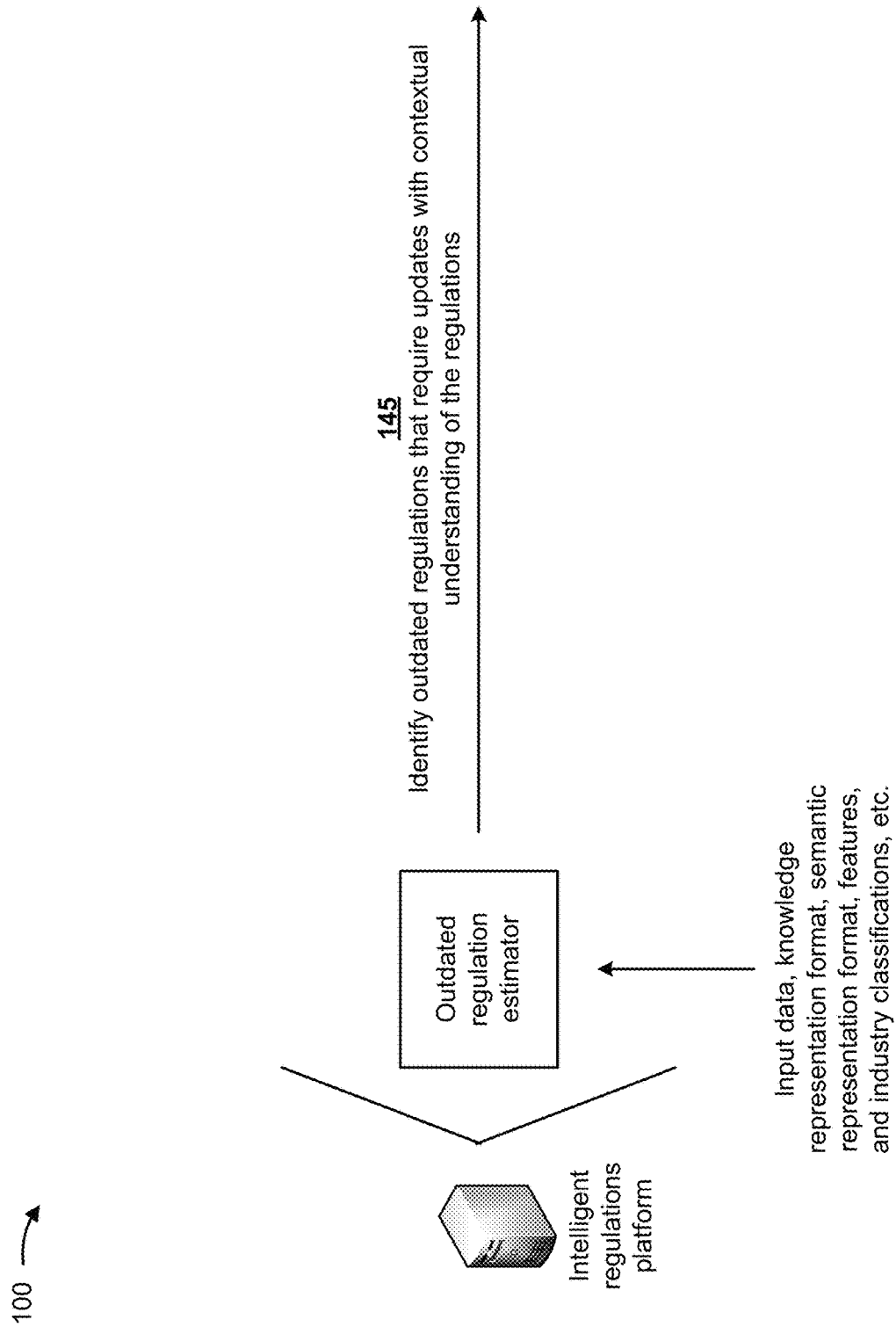

As shown in FIG. 1I, and by reference number 145, the intelligent regulations platform may identify outdated regulations that require updates with contextual understanding of the regulations based on the input data, the input data in the knowledge representation format, the input data in the semantic representation format, data identifying the features, data identifying the industry classifications, data identifying the entities of interest and/or the potential stakeholders, and/or the like. Outdated phrases and terminology in active regulations pose challenges to innovation, and add significant compliance and reporting burdens. Identifying and prioritizing such regulations, however, is a non-trivial task that requires capabilities beyond key-word searching. In some implementations, to solve this issue, the intelligent regulations platform may include multiple ensembled models that identify predetermined outdated terms and incorporate contextual analysis for scoring specific regulations and respective phrases. In some implementations, the intelligent regulations platform may output a ranked set of regulations that require review, which may increase speed and accuracy in the process and reduce resource waste.

In some implementations, the intelligent regulations platform may use machine learning models, such as a linear regression model, a linear support vector machine model, a nonlinear support vector machine model, a random forest model, and/or the like. The machine learning models may be trained in a similar manner as described above in connection with FIG. 1F. Outputs from each machine learning model may highlight a different aspect. The intelligent regulations platform may automatically select a machine learning model based on a problem statement, and the machine learning models may be interchanged as each model may deliver outputs based on different solutions to a problem.

To determine true positives with a data set, the random forest model may be a suitable model because the random forest model produces a highest accuracy for labelled data and meets a goal of optimizing for false positives while controlling for false negatives. However, the random forest model may be flexible, to predict for all variations of outputs (e.g., false positives and negatives). Therefore, depending on which insight is in question, the intelligent regulations platform may automatically select the machine learning model.

Outdated processes and words in regulations may be truly outdated or modern depending on contexts associated with the words. The machine learning model may detect a difference between regulations that are truly outdated (e.g., a true positive) against regulations that utilize outdated words and processes but are not outdated (e.g., a true negative).

Figure 1J:
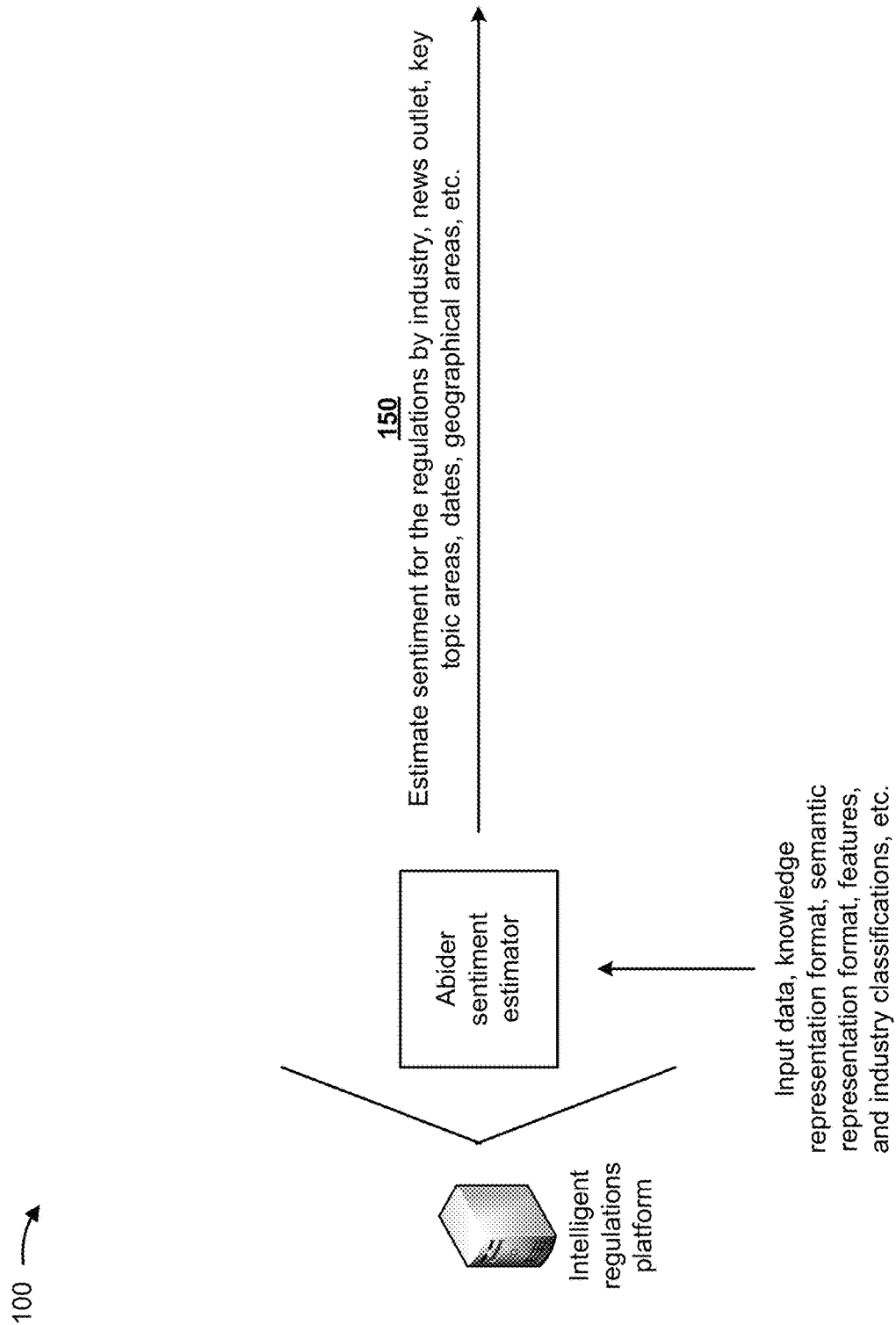

As shown in FIG. 1J, and by reference number 150, the intelligent regulations platform may estimate sentiment for the regulations by industry, news outlet, key topic areas, dates, geographical areas, and/or the like based on the input data, the input data in the knowledge representation format, the input data in the semantic representation format, data identifying the features, data identifying the industry classifications, data identifying the entities of interest and/or the potential stakeholders, and/or the like. The intelligent regulations platform may automatically collect insights from the input data, and may align regulatory amendments with articles to infer opinions, sentiment, and other insights identified by stakeholders. The intelligent regulations platform may utilize the extracted features of the input data with unsupervised machine learning models (e.g., trained as described in connection with FIG. 1F) to statistically group opinions and sentiments, and may utilize linguistic sciences to automatically remove groupings that are logically inconsistent. For each document that includes potential sentiments and opinions, the intelligent regulations platform may assess the results across all documents, and may validate that statistically driven sentiments and opinions are linguistically correct.

In some implementations, the intelligent regulations platform may estimate sentiment by industry, news outlet, key topic areas, dates, geographical areas, regulations, and/or the like. The intelligent regulations platform may filter and extract relevant information while establishing linkages among regulatory amendments, news articles, and insights generated by the intelligent regulations platform. The intelligent regulations platform may identify sentimental changes of an abider of the regulation (e.g., negative and positive) due to a change or potential aspect of change in a regulation, and may identify public opinions linked to amendments proposed for existing regulations or new regulations.

As shown in FIG. 1K, and by reference number 155, the intelligent regulations platform may estimate a prescriptive nature of the input data based on the semantic characteristics of the input data, the key features of the input data, and similarity criteria. Unnecessarily prescriptive legislation and/or regulations may pose challenges to innovation, adding significant compliance and reporting burdens. Legal regulations may also be made more intuitive, and language used in the legal regulations may a hierarchy of the legal regulations. For example, policies may be created based on the legal regulations and as a more detailed description of the legal regulations. As such, language used in the policies may be more prescriptive and directive while the language used in legal regulations should be more high level and less prescriptive.

Manually identifying prescriptive legal regulations and associated trends in the legal regulations is a time-consuming task. In some implementations, the intelligent regulations platform may utilize one or more advanced analytics techniques to automatically identify prescriptive legal regulations. To automatically and intelligently assess the prescriptive nature of the legal regulations, the intelligent regulations platform may consume and analyze labelled data sets (e.g., key words, sentences, phrases, and/or the like deemed prescriptive) to extract key features and patterns of language related to a context in which words are used and phrases are written. The intelligent regulations platform may establish additional contextual insight using key document features provided in the legal regulations, including knowledge representation to segment actions, substantiators, qualifiers, advanced pre-trained machine comprehension models, and/or the like. The intelligent regulations platform may generate prescriptive nature scores for the legal regulations by applying similarity criteria spanning around the patterns of language and the contextual insights.

Figure 1L:
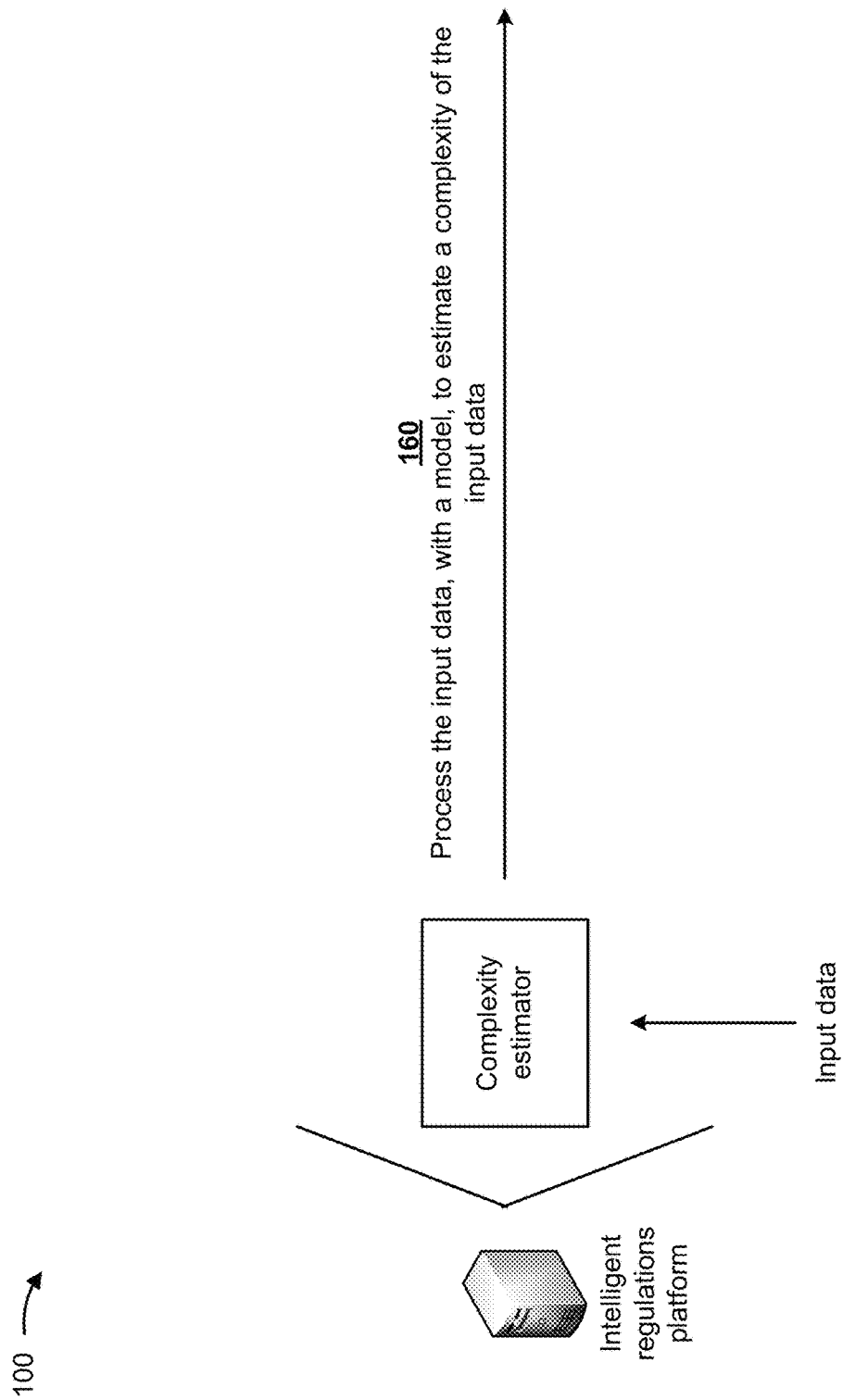

As shown in FIG. 1L, and by reference number 160, the intelligent regulations platform may process the input data, with a model (e.g., a machine learning model), to estimate a complexity of the input data. The intelligent regulations platform may train the model in a similar manner as described above in connection with FIG. 1F. In some implementations, the intelligent regulations platform may process the input data, with the model, to determine a readability score for each legal regulation and/or sections within a legal regulation. The intelligent regulations platform may compute the readability score as a function of a length of a sentence and a use of complex words. The intelligent regulations platform may build on the readability score and may construct an ensemble framework to generate additional insights using advanced supervised machine learning techniques. In some implementations, a rich feature set in a legal regulation and user-tagged and/or labeled data may be used to train the model.

Figure 1M:
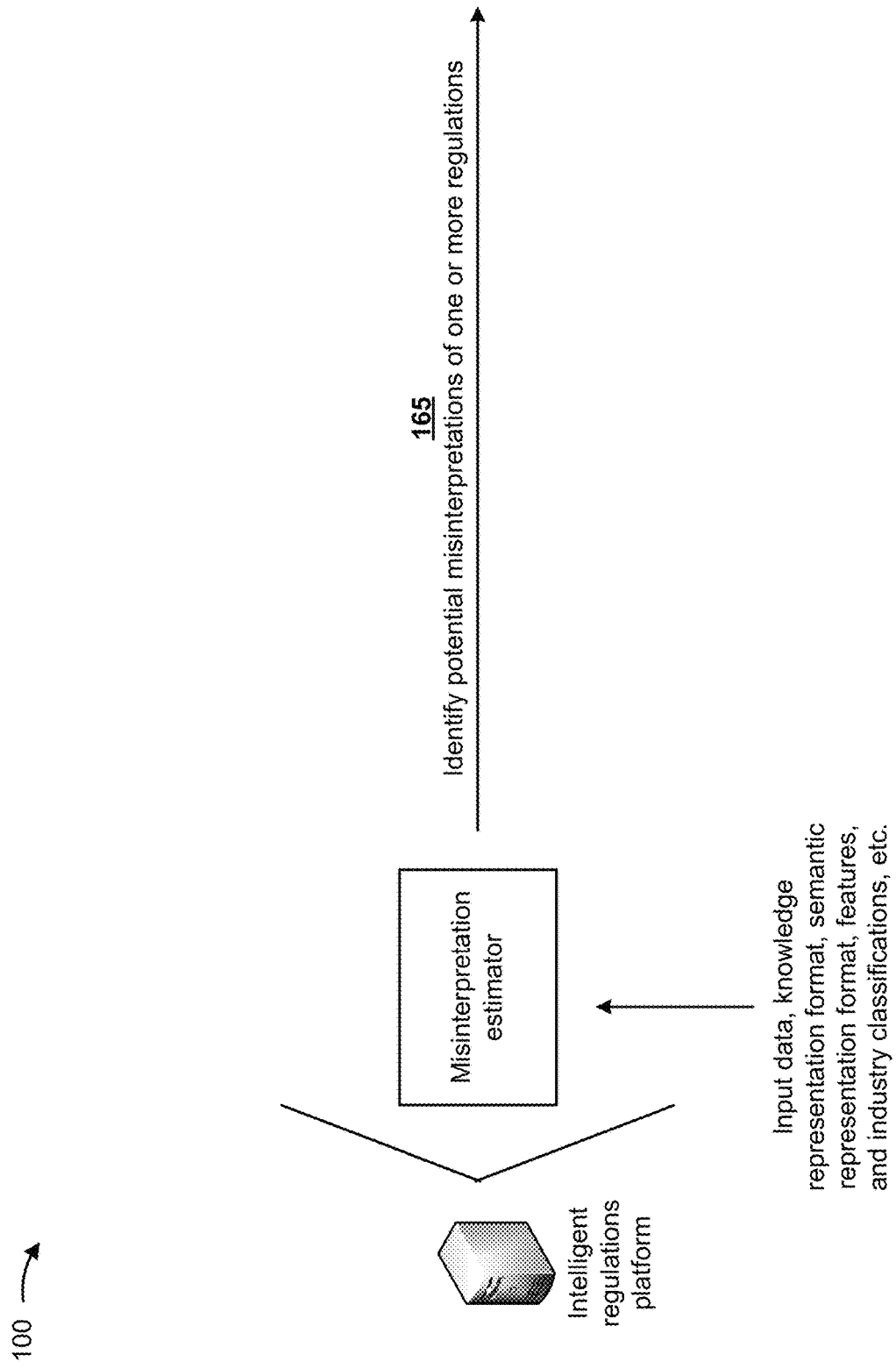

As shown in FIG. 1M, and by reference number 165, the intelligent regulations platform may identify potential misinterpretations of one or more regulations based on the input data, the input data in the knowledge representation format, the input data in the semantic representation format, data identifying the features, data identifying the industry classifications, data identifying the entities of interest and/or the potential stakeholders, and/or the like. For example, the intelligent regulations platform may identify a potential misinterpretation within a legal regulation due to how similar phrases have potential for misinterpretation and due to linguistic analysis of a grouping of words that potentially do not go well together (e.g., correlate).

Figure 1N:
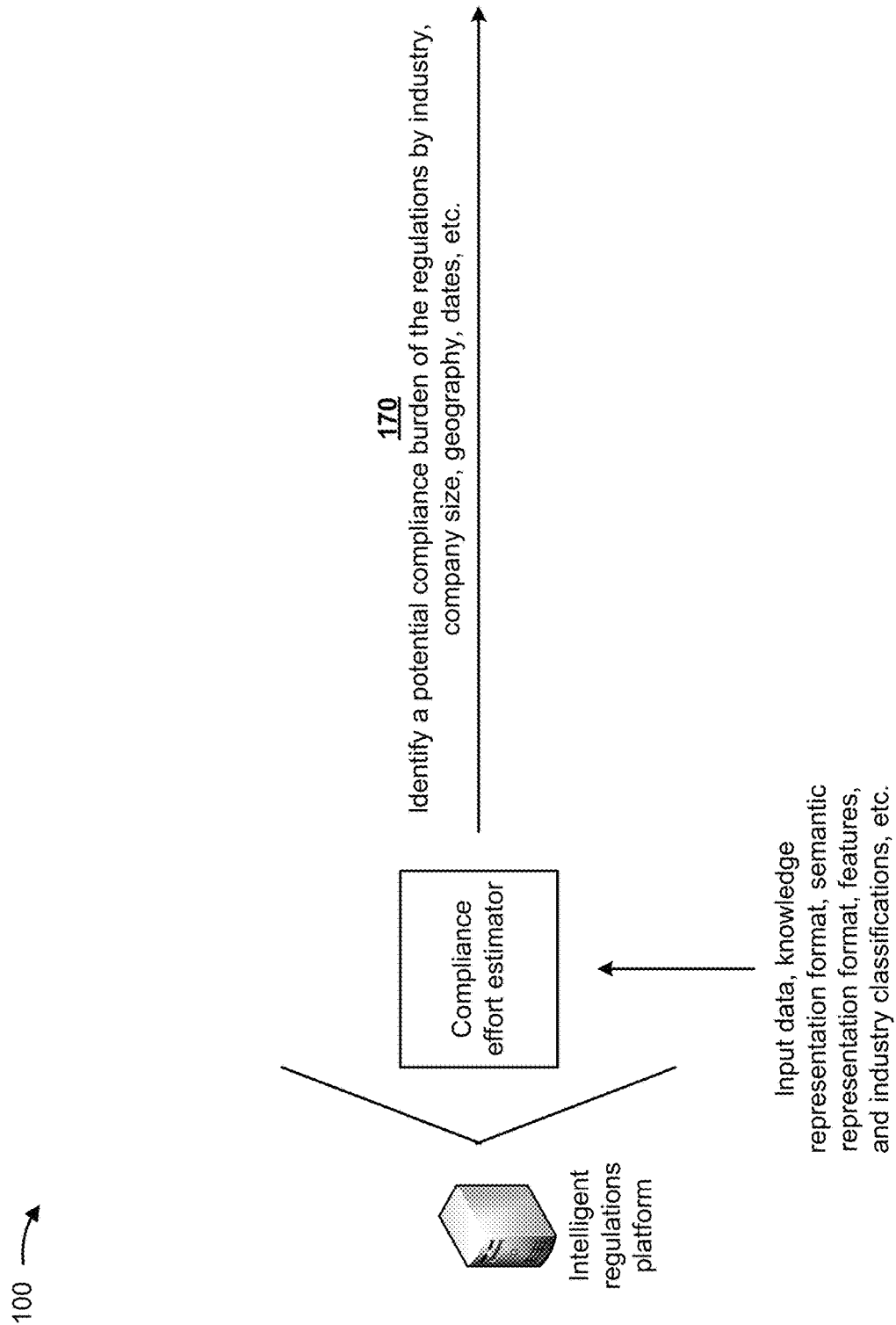
Figure 10:
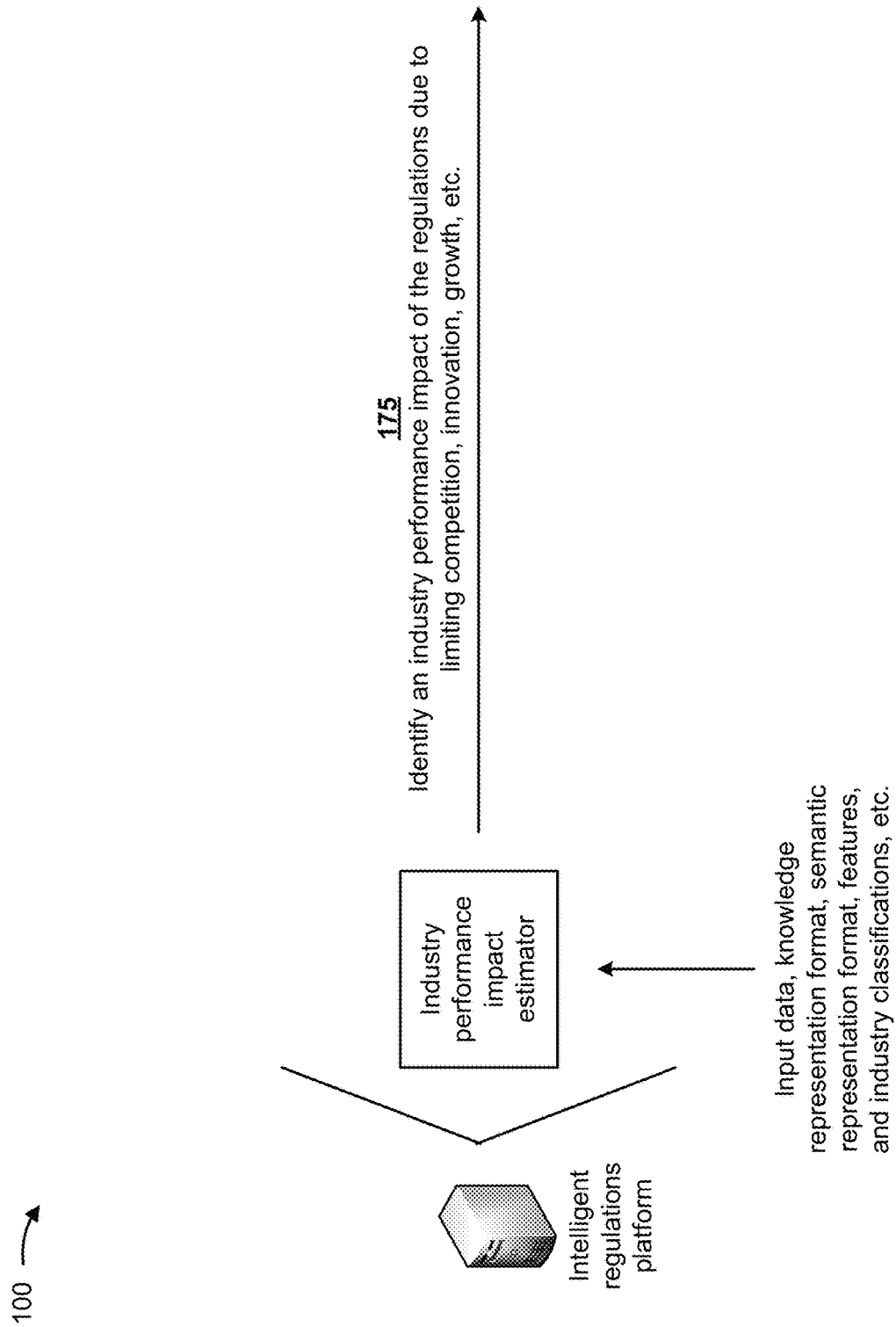

As shown in FIG. 1N, and by reference number 170, the intelligent regulations platform may identify a potential compliance burden of the legal regulations by industry, company size, geography, dates, and/or the like based on the input data, the input data in the knowledge representation format, the input data in the semantic representation format, data identifying the features, data identifying the industry classifications, data identifying the entities of interest and/or the potential stakeholders, and/or the like. For example, the intelligent regulations platform may identify specific processes, budgets, and manpower that an entity would need to utilize in order to satisfy a legal regulation, as well as potential legal punishment and monetary fines for violating the legal regulation, and may calculate a value (e.g., a potential compliance burden) based on the identified information.

As shown in FIG. 1O, and by reference number 175, the intelligent regulations platform may identify an industry performance impact of the legal regulations due to limiting competition, innovation, growth, and/or the like based on the input data, the input data in the knowledge representation format, the input data in the semantic representation format, data identifying the features, data identifying the industry classifications, data identifying the entities of interest and/or the potential stakeholders, and/or the like. For example, the intelligent regulations platform may predict that a legal regulation forbidding the use of gasoline-powered vehicles may limit competition, innovation, growth, and/or the like for an industry associated with producing gasoline-powered vehicles, an industry associated with refining oil into gasoline, and/or the like.

Figure 1P:
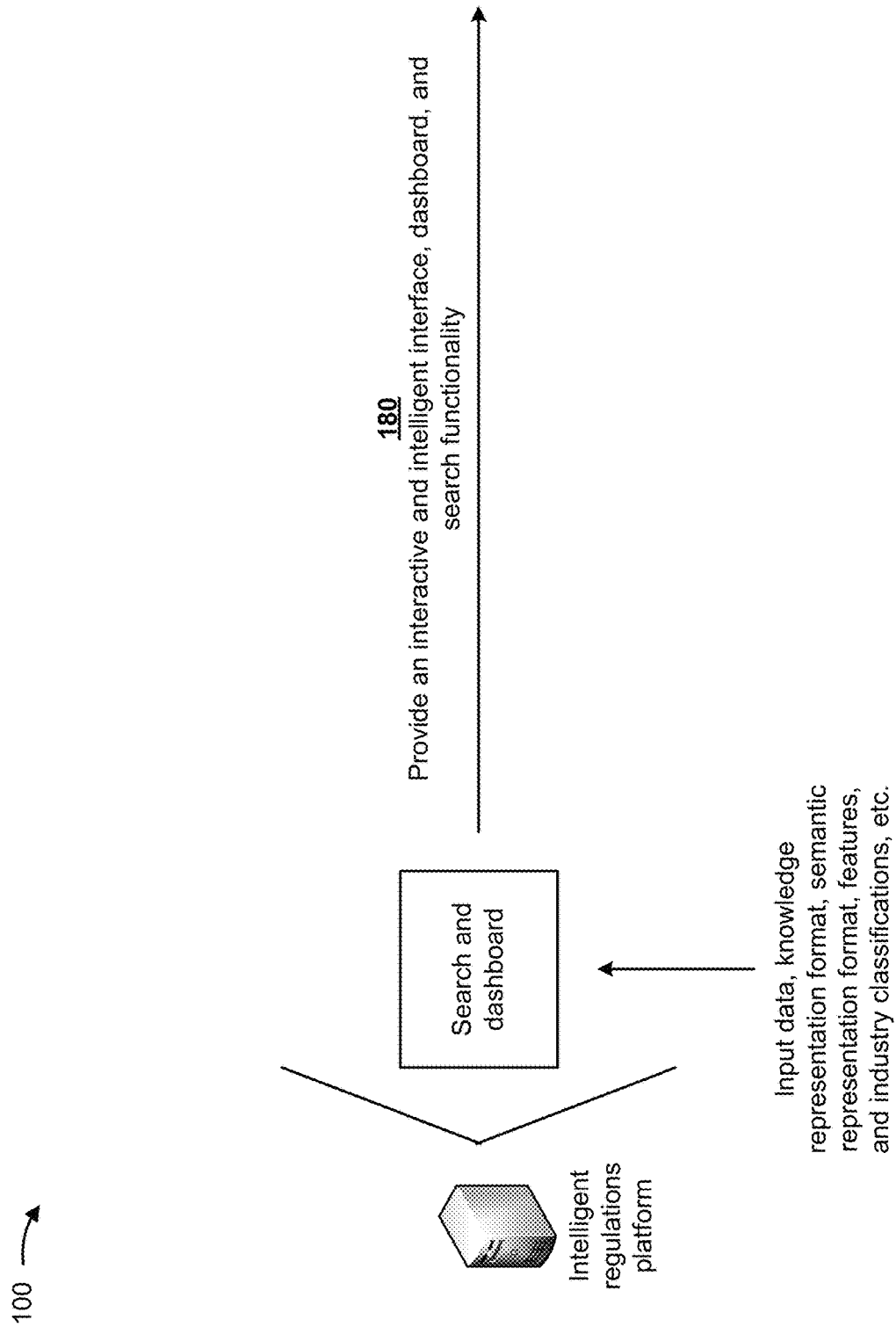

As shown in FIG. 1P, and by reference number 180, the intelligent regulations platform may provide an interactive and intelligent interface, dashboard, and search functionality (e.g., to a client device associated with the intelligent regulations platform) based on the input data, the input data in the knowledge representation format, the input data in the semantic representation format, data identifying the features, data identifying the industry classifications, data identifying the entities of interest and/or the potential stakeholders, and/or the like. For example, the intelligent regulations platform may generate an interactive and intelligent user interface that provides a user with insights into legal regulations and/or outputs of the intelligent regulations platform. The intelligent regulations platform may provide a dashboard that is automatically populated with real-time insights into legal regulations and facilitates intelligent key word and/or phrase searches to browse through the legal regulations. The intelligent regulations platform may provide an application that enables users to tag certain sections of the legal regulations and that creates a feedback loop for the models of the intelligent regulations platform.

As shown in FIG. 1Q, and by reference number 185, the intelligent regulations platform may automatically perform one or more actions based on the outputs of estimators (e.g., based on the input data, the input data in the knowledge representation format, the input data in the semantic representation format, data identifying the features, data identifying the industry classifications, data identifying the entities of interest and/or the potential stakeholders, and/or the like). In some implementations, the intelligent regulations platform may receive (e.g., from the outputs of the estimators) a prioritized list of legal regulations, an estimation of workload for subject matter expert review, contextual insights data, and/or the like. The intelligent regulations platform may utilize the prioritized list of legal regulations and the estimation of workload to automatically assign tasks to individuals (e.g., with a timeline and milestones). The intelligent regulations platform may track completion of the tasks against the timeline, and may wait for approval to continue to escalate a task or to stop task escalation. If a task is escalated further, the intelligent regulations platform may track details of why the task is escalated further and may reassign the task. If a task is not escalated further, the intelligent regulations platform may return information indicating why the task is not escalated further.

Figure 1R:
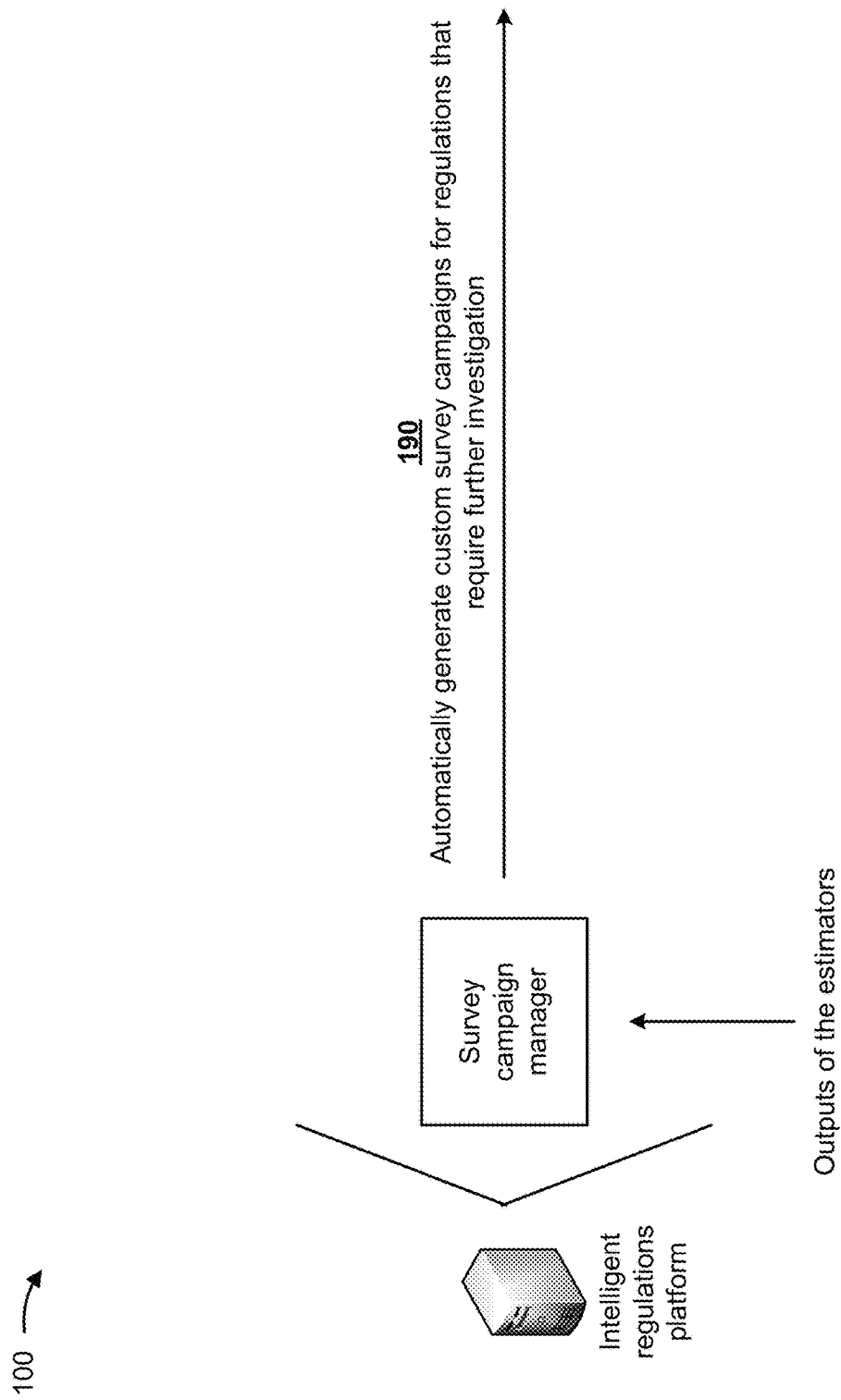

As shown in FIG. 1R, and by reference number 190, the intelligent regulations platform may automatically generate, based on the outputs of the estimators, custom survey campaigns for legal regulations that require further investigation. In some implementations, the intelligent regulations platform may receive a list of legal regulations that needs to be further investigated through a custom survey campaign that includes geographical units, key topics, industries, demographics, and/or the like. The intelligent regulations platform may derive a custom survey questionnaire and a target market segmentation on which to execute survey campaigns to validate estimations and to provide proactive measures back to the public. Depending on a confidence score, the intelligent regulations platform may seek validation from specific subject matter experts, or may send the survey out to an entity. The intelligent regulations platform may receive survey results, and may validate abider sentiments (e.g., which may enable a government to take proactive actions). The intelligent regulations platform may inform key external and internal stakeholders about the survey results, and may suggest further actions for subject matter experts to validate through the workflow manager.

As shown in FIG. 1S, and by reference number 195, the intelligent regulations platform may provide, to a client device associated with a user, information for generating customer survey campaigns. The client device may receive the information, and may present the information to the user via a user interface. In some implementations, the information may indicate that regulation X requires further investigation into its legality, that regulation Y requires a consumer sentiment survey, that regulation Z requires a survey of politicians, and/or the like.

In this way, several different stages of the process for generating contextual insights and actions based on legal regulations may be automated via machine learning models, which may improve speed and efficiency of the process and conserve computing resources (e.g., processing resources, memory resources, and/or the like). Furthermore, implementations described herein use a rigorous, computerized process to perform tasks or roles that were not previously performed. For example, currently there does not exist a technique that utilizes machine learning models to automatically generate contextual insights and actions based on legal regulations. Further, the process for utilizing machine learning models to automatically generate contextual insights and actions based on legal regulations conserves resources (e.g., processing resources, memory resources, network resources, and/or the like) that would otherwise be wasted in poor management of resource usage, mis-allocation of resources, overuse of resources, and/or the like.

As indicated above, FIGS. 1A-1S are provided merely as examples. Other examples may differ from what is described with regard to FIGS. 1A-1S.

Figure 2:
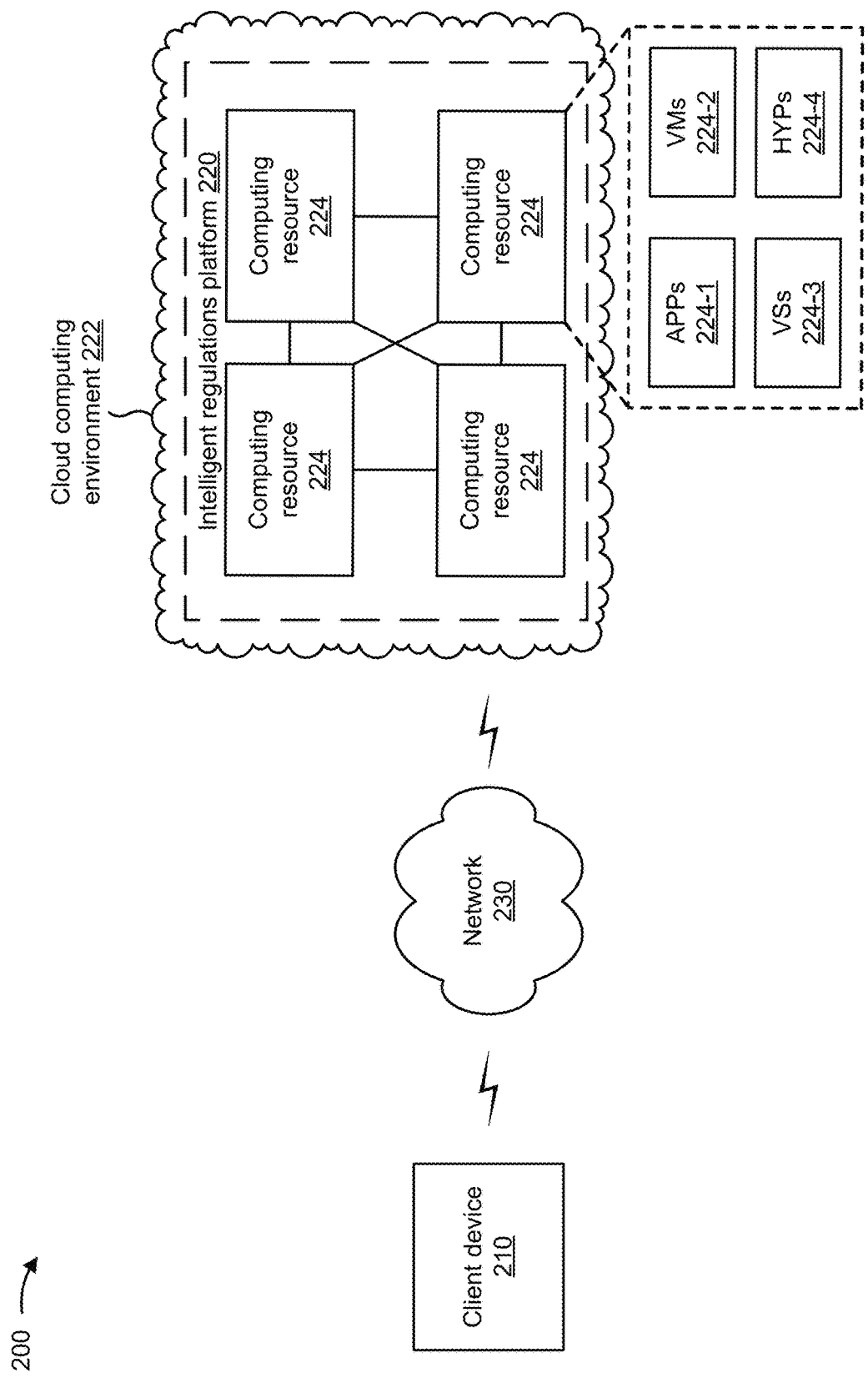
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a client device 210, an intelligent regulations platform 220, and a network 230. Devices of environment 200 may interconnect via wired connections, wireless connections, or a combination of wired and wireless connections.

Client device 210 includes one or more devices capable of receiving, generating, storing, processing, and/or providing information, such as information described herein. For example, client device 210 may include a mobile phone (e.g., a smart phone, a radiotelephone, and/or the like), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, and/or the like), or a similar type of device. In some implementations, client device 210 may receive information from and/or transmit information to intelligent regulations platform 220.

Intelligent regulations platform 220 includes one or more devices that utilize machine learning models to automatically generate contextual insights and actions based on legal regulations. In some implementations, intelligent regulations platform 220 may be designed to be modular such that certain software components may be swapped in or out depending on a particular need. As such, intelligent regulations platform 220 may be easily and/or quickly reconfigured for different uses. In some implementations, intelligent regulations platform 220 may receive information from and/or transmit information to one or more client devices 210.

In some implementations, as shown, intelligent regulations platform 220 may be hosted in a cloud computing environment 222. Notably, while implementations described herein describe intelligent regulations platform 220 as being hosted in cloud computing environment 222, in some implementations, intelligent regulations platform 220 may not be cloud-based (i.e., may be implemented outside of a cloud computing environment) or may be partially cloud-based.

Cloud computing environment 222 includes an environment that hosts intelligent regulations platform 220. Cloud computing environment 222 may provide computation, software, data access, storage, etc., services that do not require end-user knowledge of a physical location and configuration of system(s) and/or device(s) that hosts intelligent regulations platform 220. As shown, cloud computing environment 222 may include a group of computing resources 224 (referred to collectively as "computing resources 224" and individually as "computing resource 224").

Computing resource 224 includes one or more personal computers, workstation computers, mainframe devices, or other types of computation and/or communication devices. In some implementations, computing resource 224 may host intelligent regulations platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by client device 210. Application 224-1 may eliminate a need to install and execute the software applications on client device 210. For example, application 224-1 may include software associated with intelligent regulations platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program and may support a single process. In some implementations, virtual machine 224-2 may execute on behalf of a user (e.g., a user of client device 210 or an operator of intelligent regulations platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
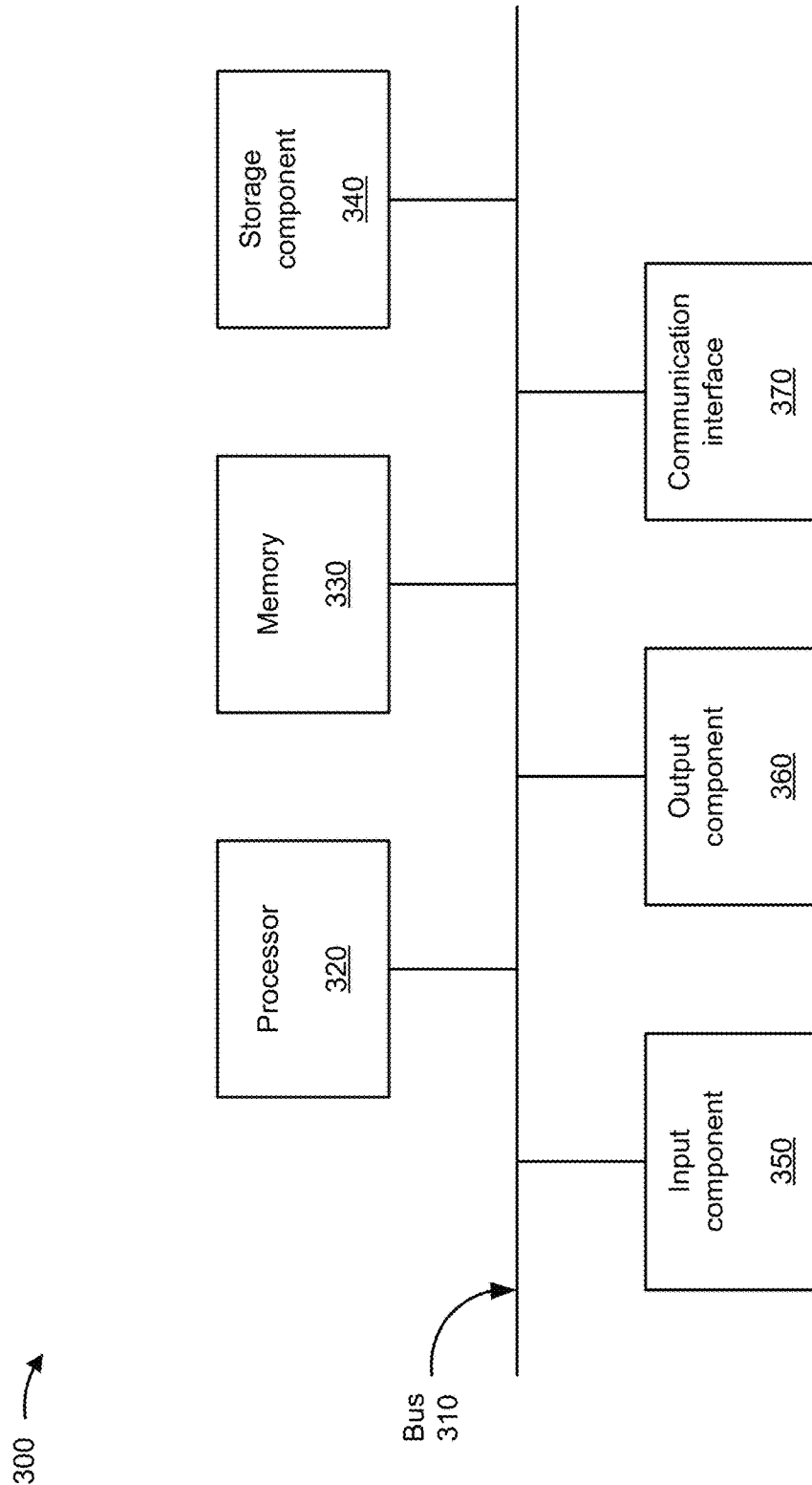
FIG. 3 is a diagram of example components of one or more devices of FIG. 2.

FIG. 3 is a diagram of example components of a device 300. Device 300 may correspond to client device 210, intelligent regulations platform 220, and/or computing resource 224. In some implementations, client device 210, intelligent regulations platform 220, and/or computing resource 224 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
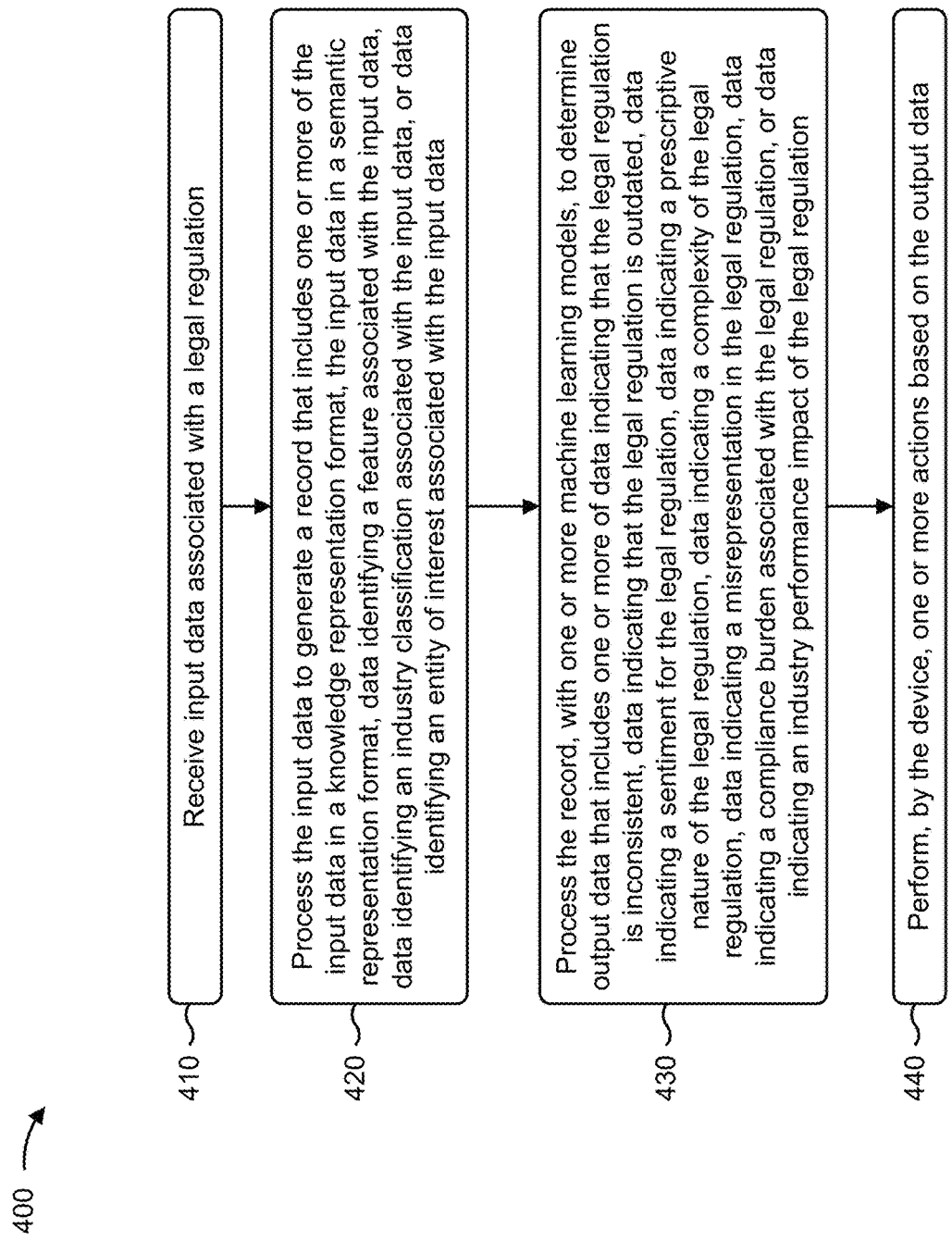

FIG. 4 is a flow chart of an example process 400 for utilizing machine learning models to automatically generate contextual insights and actions based on legal regulations. In some implementations, one or more process blocks of FIG. 4 may be performed by an intelligent regulations platform (e.g., intelligent regulations platform 220). In some implementations, one or more process blocks of FIG. 4 may be performed by another device or a group of devices separate from or including the intelligent regulations platform, such as a client device (e.g., client device 210).

As shown in FIG. 4, process 400 may include receiving input data associated with a legal regulation (block 410). For example, the intelligent regulations platform (e.g., using computing resource 224, processor 320, communication interface 370, and/or the like) may receive input data associated with a legal regulation, as described above.

As further shown in FIG. 4, process 400 may include processing the input data to generate a record that includes one or more of the input data in a knowledge representation format the input data in a semantic representation format, data identifying a feature associated with the input data, data identifying an industry classification associated with the input data, or data identifying an entity of interest associated with the input data (block 420). For example, the intelligent regulations platform (e.g., using computing resource 224, processor 320, memory 330, and/or the like) may process the input data to generate a record that includes one or more of the input data in a knowledge representation format, the input data in a semantic representation format, data identifying a feature associated with the input data, data identifying an industry classification associated with the input data, or data identifying an entity of interest associated with the input data, as described above.

As further shown in FIG. 4, process 400 may include processing the record, with one or more machine learning models, to determine output data that includes one or more of data indicating that the legal regulation is inconsistent, data indicating that the legal regulation is outdated, data indicating a sentiment for the legal regulation, data indicating a prescriptive nature of the legal regulation, data indicating a complexity of the legal regulation, data indicating a misrepresentation in the legal regulation, data indicating a compliance burden associated with the legal regulation, or data indicating an industry performance impact of the legal regulation (block 430). For example, the intelligent regulations platform (e.g., using computing resource 224, processor 320, storage component 340, and/or the like) may process the record, with one or more machine learning models, to determine output data that includes one or more of data indicating that the legal regulation is inconsistent, data indicating that the legal regulation is outdated, data indicating a sentiment for the legal regulation, data indicating a prescriptive nature of the legal regulation, data indicating a complexity of the legal regulation, data indicating a misrepresentation in the legal regulation, data indicating a compliance burden associated with the legal regulation, or data indicating an industry performance impact of the legal regulation, as described above.

As further shown in FIG. 4, process 400 may include performing one or more actions based on the output data (block 440). For example, the intelligent regulations platform (e.g., using computing resource 224, processor 320, memory 330, storage component 340, communication interface 370, and/or the like) may perform one or more actions based on the output data, as described above.

Process 400 may include additional implementations, such as any single implementation or any combination of implementations described below and/or in connection with one or more other processes described elsewhere herein.

In a first implementation, the intelligent regulations platform may format, with one or more natural language processing techniques, the input data into a predetermined format prior to processing the input data.

In a second implementation, alone or in combination with the first implementation, when processing the input data, to generate the record, the intelligent regulations platform may identify, in the input data, regulation components that describe the legal regulation, and may generate the input data in the knowledge representation format based on combining the regulation components.

In a third implementation, alone or in combination with one or more of the first and second implementations, when processing the input data, to generate the record, the intelligent regulations platform may divide free-form text, for each section of the knowledge representation format, into linguistical forms to generate the input data in the semantic representation format.

In a fourth implementation, alone or in combination with one or more of the first through third implementations, when processing the input data, to generate the record, the intelligent regulations platform may generate the feature based on assigning weights per word or phrase, may generate the feature based on each different section of the knowledge representation format, may generate the feature based on grouping words and phrases that are statistically similar, may generate the feature based on assigning cannibalism and complementation weighting factors per word and phrase, and/or the like.

In a fifth implementation, alone or in combination with one or more of the first through fourth implementations, when processing the input data, to generate the record, the intelligent regulations platform may process the input data, with the one or more machine learning models, to generate the industry classification associated with the input data.

In a sixth implementation, alone or in combination with one or more of the first through fifth implementations, when processing the record, with the one or more machine learning models, to determine the output data, the intelligent regulations platform may process the record, with multiple unsupervised machine learning models of the one or more machine learning models, to determine the data indicating that the legal regulation is inconsistent.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
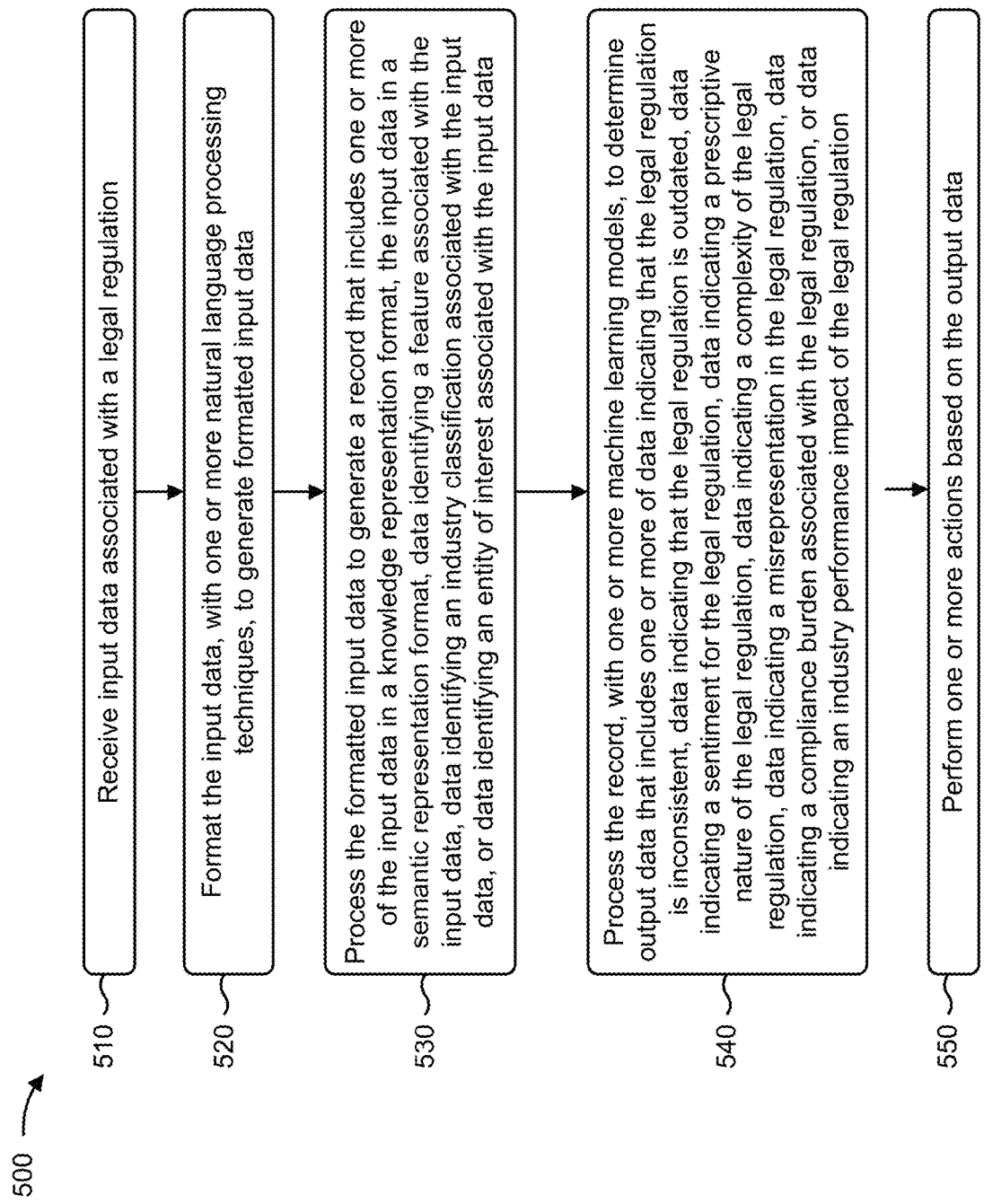

FIG. 5 is a flow chart of an example process 500 for utilizing machine learning models to automatically generate contextual insights and actions based on legal regulations. In some implementations, one or more process blocks of FIG. 5 may be performed by an intelligent regulations platform (e.g., intelligent regulations platform 220). In some implementations, one or more process blocks of FIG. 5 may be performed by another device or a group of devices separate from or including the intelligent regulations platform, such as a client device (e.g., client device 210).

As shown in FIG. 5, process 500 may include receiving input data associated with a legal regulation (block 510). For example, the intelligent regulations platform (e.g., using computing resource 224, processor 320, communication interface 370, and/or the like) may receive input data associated with a legal regulation, as described above.

As further shown in FIG. 5, process 500 may include format the input data, with one or more natural language processing techniques, to generate formatted input data (block 520). For example, the intelligent regulations platform (e.g., using computing resource 224, processor 320, memory 330, and/or the like) may format the input data, with one or more natural language processing techniques, to generate formatted input data, as described above.

As further shown in FIG. 5, process 500 may include processing the formatted input data to generate a record that includes one or more of the input data in a knowledge representation format, the input data in a semantic representation format, data identifying a feature associated with the input data, data identifying an industry classification associated with the input data, or data identifying an entity of interest associated with the input data (block 530). For example, the intelligent regulations platform (e.g., using computing resource 224, processor 320, storage component 340, and/or the like) may process the formatted input data to generate a record that includes one or more of the input data in a knowledge representation format, the input data in a semantic representation format, data identifying a feature associated with the input data, data identifying an industry classification associated with the input data, or data identifying an entity of interest associated with the input data, as described above.

As further shown in FIG. 5, process 500 may include processing the record, with one or more machine learning models, to determine output data that includes one or more of data indicating that the legal regulation is inconsistent, data indicating that the legal regulation is outdated, data indicating a sentiment for the legal regulation, data indicating a prescriptive nature of the legal regulation, data indicating a complexity of the legal regulation, data indicating a misrepresentation in the legal regulation, data indicating a compliance burden associated with the legal regulation, or data indicating an industry performance impact of the legal regulation (block 540). For example, the intelligent regulations platform (e.g., using computing resource 224, processor 320, memory 330, and/or the like) may process the record, with one or more machine learning models, to determine output data that includes one or more of data indicating that the legal regulation is inconsistent, data indicating that the legal regulation is outdated, data indicating a sentiment for the legal regulation, data indicating a prescriptive nature of the legal regulation, data indicating a complexity of the legal regulation, data indicating a misrepresentation in the legal regulation, data indicating a compliance burden associated with the legal regulation, or data indicating an industry performance impact of the legal regulation, as described above.

As further shown in FIG. 5, process 500 may include performing one or more actions based on the output data (block 550). For example, the intelligent regulations platform (e.g., using computing resource 224, processor 320, memory 330, storage component 340, communication interface 370, and/or the like) may perform one or more actions based on the output data, as described above.

Process 500 may include additional implementations, such as any single implementation or any combination of implementations described below and/or in connection with one or more other processes described elsewhere herein.

In a first implementation, the intelligent regulations platform, when processing the record, with the one or more machine learning models, to determine the output data, may select a particular machine learning model from the one or more machine learning models based on a problem statement, and may process the record, with the particular machine learning model, to generate the data indicating that the legal regulation is outdated.

In a second implementation, alone or in combination with the first implementation, the intelligent regulations platform, when processing the record, with the one or more machine learning models, to determine the output data, may process the data identifying the feature associated with the input data, with the one or more machine learning models, to statistically group sentiments indicated by the input data, and may utilize linguistic models to remove groupings of sentiments that are inconsistent and to determine the data indicating the sentiment for the legal regulation.

In a third implementation, alone or in combination with one or more of the first and second implementations, the intelligent regulations platform, when processing the record, with the one or more machine learning models, to determine the output data, may determine the data indicating the prescriptive nature of the legal regulation based on semantic characteristics of the input data, the data identifying the feature associated with the input data, and a similarity criterion.

In a fourth implementation, alone or in combination with one or more of the first through third implementations, the intelligent regulations platform, when processing the record, with the one or more machine learning models, to determine the output data, may process the record, with one of the one or more machine learning models, to determine a readability score for the legal regulation as a function of one or more lengths of sentences and a use of complex words in the legal regulation, and may determine the data indicating the complexity of the legal regulation based on the readability score.

In a fifth implementation, alone or in combination with one or more of the first through fourth implementations, the intelligent regulations platform, when processing the record, with the one or more machine learning models, to determine the output data, may identify the data indicating the misrepresentation in the legal regulation based on how similar phrases in the legal regulation have potential for misinterpretation, and a linguistic analysis of a grouping of words in the legal regulation that do not correlate.

In a sixth implementation, alone or in combination with one or more of the first through fifth implementations, the intelligent regulations platform, when performing the one or more actions based on the output data, may one or more of: provide, to a client device, the output data via an interactive user interface that includes a dashboard and a search functionality, assign a task associated with the legal regulation and based on the output data, or generate, based on the output data, a custom survey campaign for the legal regulation.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for utilizing machine learning models to automatically generate contextual insights and actions based on legal regulations. In some implementations, one or more process blocks of FIG. 6 may be performed by an intelligent regulations platform (e.g., intelligent regulations platform 220). In some implementations, one or more process blocks of FIG. 6 may be performed by another device or a group of devices separate from or including the intelligent regulations platform, such as a client device (e.g., client device 210).

As shown in FIG. 6, process 600 may include receiving input data associated with a legal regulation (block 610). For example, the intelligent regulations platform (e.g., using computing resource 224, processor 320, communication interface 370, and/or the like) may receive input data associated with a legal regulation, as described above.

As further shown in FIG. 6, process 600 may include processing the input data to generate a regulation analytical record that includes one or more of: the input data in a knowledge representation format, the input data in a semantic representation format, data identifying a feature associated with the input data, data identifying an industry classification associated with the input data, or data identifying an entity of interest associated with the input data (block 620). For example, the intelligent regulations platform (e.g., using computing resource 224, processor 320, memory 330, and/or the like) may process the input data to generate a regulation analytical record that includes one or more of the input data in a knowledge representation format, the input data in a semantic representation format, data identifying a feature associated with the input data, data identifying an industry classification associated with the input data, or data identifying an entity of interest associated with the input data, as described above.

As further shown in FIG. 6, process 600 may include processing the regulation analytical record, with one or more machine learning models, to determine output data that includes one or more of: data indicating that the legal regulation is inconsistent, data indicating that the legal regulation is outdated, data indicating a sentiment for the legal regulation, data indicating a prescriptive nature of the legal regulation, data indicating a complexity of the legal regulation, data indicating a misrepresentation in the legal regulation, data indicating a compliance burden associated with the legal regulation, or data indicating an industry performance impact of the legal regulation (block 630). For example, the intelligent regulations platform (e.g., using computing resource 224, processor 320, storage component 340, and/or the like) may process the regulation analytical record, with one or more machine learning models, to determine output data that includes one or more of data indicating that the legal regulation is inconsistent, data indicating that the legal regulation is outdated, data indicating a sentiment for the legal regulation, data indicating a prescriptive nature of the legal regulation, data indicating a complexity of the legal regulation, data indicating a misrepresentation in the legal regulation, data indicating a compliance burden associated with the legal regulation, or data indicating an industry performance impact of the legal regulation, as described above.

As further shown in FIG. 6, process 600 may include performing one or more actions based on the output data, wherein the one or more actions include one or more of: providing, to a client device, the output data via an interactive user interface that includes a dashboard and a search functionality, assigning a task associated with the legal regulation and based on the output data, or generating, based on the output data, a custom survey campaign for the legal regulation (block 640). For example, the intelligent regulations platform (e.g., using computing resource 224, processor 320, memory 330, storage component 340, communication interface 370, and/or the like) may perform one or more actions based on the output data, as described above. In some aspects, the one or more actions may include one or more of providing, to a client device, the output data via an interactive user interface that includes a dashboard and a search functionality, assigning a task associated with the legal regulation and based on the output data, or generating, based on the output data, a custom survey campaign for the legal regulation.

Process 600 may include additional implementations, such as any single implementation or any combination of implementations described below and/or in connection with one or more other processes described elsewhere herein.

In a first implementation, the intelligent regulations platform, when processing the input data to generate the regulation analytical record, may identify, in the input data, regulation components that describe the legal regulation, and may generate the input data in the knowledge representation format based on combining the regulation components.

In a second implementation, alone or in combination with the first implementation, the intelligent regulations platform, when processing the regulation analytical record, with the one or more machine learning models, to determine the output data, may process the regulation analytical record, with multiple unsupervised machine learning models of the one or more machine learning models, to determine the data indicating that the legal regulation is inconsistent, wherein the multiple unsupervised machine learning models may include a first latent semantic indexing (LSI) model with a first predetermined threshold, a second LSI model with a second predetermined threshold, and a density-based spatial clustering of applications with noise model.

In a third implementation, alone or in combination with one or more of the first and second implementations, the intelligent regulations platform, when processing the regulation analytical record, with the one or more machine learning models, to determine the output data, may select a particular machine learning model from the one or more machine learning models based on a problem statement, and may process the regulation analytical record, with the particular machine learning model, to generate the data indicating that the legal regulation is outdated.

In a fourth implementation, alone or in combination with one or more of the first through third implementations, the intelligent regulations platform, when processing the regulation analytical record, with the one or more machine learning models, to determine the output data, may determine the data indicating the prescriptive nature of the legal regulation based on semantic characteristics of the input data, the data identifying the feature associated with the input data, and a similarity criterion.

In a fifth implementation, alone or in combination with one or more of the first through fourth implementations, the intelligent regulations platform, when processing the regulation analytical record, with the one or more machine learning models, to determine the output data, may process the regulation analytical record, with one of the one or more machine learning models, to determine a readability score for the legal regulation as a function of one or more lengths of sentences and a use of complex words in the legal regulation, and may determine the data indicating the complexity of the legal regulation based on the readability score.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, and/or the like). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:
1. A method, comprising:
   receiving, by a device, input data associated with a legal regulation;
   processing, by the device, the input data to generate a record that includes one or more of:
      the input data in a knowledge representation format,
      the input data in a semantic representation format,
      data identifying a feature associated with the input data, data identifying an industry classification associated with the input data, or data identifying an entity of interest associated with the input data;

determining, by the device and based on one or more machine learning models, a similarity index associated with the input data;

determining, by the device and based on the one or more machine learning models, whether the similarity index satisfies a threshold;

mapping, by the device and based on determining whether the similarity index satisfies the threshold, input data to one or more sectors, wherein the similarity index is based on semantic similarity scores;

processing, by the device, the record, with the one or more machine learning models and based on the mapping, to determine output data that includes one or more of:

data indicating that the legal regulation is inconsistent, data indicating that the legal regulation is outdated, data indicating a sentiment for the legal regulation, data indicating a prescriptive nature of the legal regulation, data indicating a complexity of the legal regulation, data indicating a misrepresentation in the legal regulation, data indicating a compliance burden associated with the legal regulation, or data indicating an industry performance impact of the legal regulation;

performing, by the device, one or more actions based on the output data;

identifying, by the device and based on the one or more machine learning models, predetermined outdated terms;

determining, by the device, based on incorporating contextual analysis, and based on identifying the predetermined outdated terms, scores associated with specific regulations and respective phrases;

identifying, by the device and based on the determined scores, an outdated set of regulations that requires updates, wherein the outdated set of regulations is identified from a group of regulations that include the legal regulation;

providing, by the device, based on identifying the outdated set of regulations, and based on the one or more machine learning models, a ranked set of the outdated set of regulations; and updating, by the device, via a feedback loop, and based on the output data, the one or more machine learning models to enhance accuracy of the one or more machine learning models.

2. The method of claim 1, further comprising:

formatting, with one or more natural language processing techniques, the input data into a predetermined format prior to processing the input data.

3. The method of claim 1, wherein processing the input data, to generate the record, comprises:

identifying, in the input data, regulation components that describe the legal regulation; and generating the input data in the knowledge representation format based on combining the regulation components.

4. The method of claim 1, wherein processing the input data, to generate the record, comprises:

dividing free-form text, for each section of the knowledge representation format, into linguistical forms to generate the input data in the semantic representation format.

5. The method of claim 1, wherein processing the input data, to generate the record, comprises one or more of:

generating the feature based on assigning weights per word or phrase;

generating the feature based on each different section of the knowledge representation format;

generating the feature based on grouping words and phrases that are statistically similar; or generating the feature based on assigning cannibalism and complementation weighting factors per word and phrase.

6. The method of claim 1, wherein processing the input data, to generate the record, comprises:

processing the input data, with the one or more machine learning models, to generate the industry classification associated with the input data.

7. The method of claim 1, wherein processing the record, with the one or more machine learning models, to determine the output data, comprises:

processing the record, with multiple unsupervised machine learning models of the one or more machine learning models, to determine the data indicating that the legal regulation is inconsistent, wherein the multiple unsupervised machine learning models include:

a first latent semantic indexing (LSI) model with a first predetermined threshold, a second LSI model with a second predetermined threshold, and a density-based spatial clustering of applications with noise model.

8. A device, comprising:

one or more memories; and one or more processors, communicatively coupled to the one or more memories, to:

receive input data associated with a legal regulation;

format the input data, with one or more natural language processing techniques, to generate formatted input data;

process the formatted input data to generate a record that includes one or more of:

the input data in a knowledge representation format, the input data in a semantic representation format, data identifying a feature associated with the input data, data identifying an industry classification associated with the input data, or data identifying an entity of interest associated with the input data;

determine, based on one or more machine learning models, a similarity index associated with the input data;

determine, based on the one or more machine learning models, whether the similarity index satisfies a threshold;

map, based on determining whether the similarity index satisfies the threshold, input data to one or more sectors, wherein the similarity index is based on semantic similarity scores;

process the record, with the one or more machine learning models and based on the mapping, to determine output data that includes one or more of:

data indicating that the legal regulation is inconsistent,
data indicating that the legal regulation is outdated,
data indicating a sentiment for the legal regulation,
data indicating a prescriptive nature of the legal regulation,
data indicating a complexity of the legal regulation,
data indicating a misrepresentation in the legal regulation,
data indicating a compliance burden associated with the legal regulation, or
data indicating an industry performance impact of the legal regulation;
perform one or more actions based on the output data;
identify, based on the one or more machine learning models, predetermined outdated terms;
determine, based on incorporating contextual analysis and based on identifying the predetermined outdated terms, scores associated with specific regulations and respective phrases;
identify, based on the determined scores, an outdated set of regulations that requires updates,
wherein the outdated set of regulations is identified from a group of regulations that include the legal regulation;
provide, based on identifying the outdated set of regulations and based on the one or more machine learning models, a ranked set of the outdated set of regulations; and
update, via a feedback loop, and based on the output data, the one or more machine learning models to enhance accuracy of the one or more machine learning models.

9. The device of claim 8, wherein the one or more processors, when processing the record, with the one or more machine learning models, to determine the output data, are to:
select a particular machine learning model from the one or more machine learning models based on a problem statement; and
process the record, with the particular machine learning model, to generate the data indicating that the legal regulation is outdated.

10. The device of claim 8, wherein the one or more processors, when processing the record, with the one or more machine learning models, to determine the output data, are to:
process the data identifying the feature associated with the input data, with the one or more machine learning models, to statistically group sentiments indicated by the input data; and
utilize linguistic models to remove groupings of sentiments that are inconsistent and to determine the data indicating the sentiment for the legal regulation.

11. The device of claim 8, wherein the one or more processors, when processing the record, with the one or more machine learning models, to determine the output data, are to:
determine the data indicating the prescriptive nature of the legal regulation based on semantic characteristics of the input data, the data identifying the feature associated with the input data, and a similarity criterion.

12. The device of claim 8, wherein the one or more processors, when processing the record, with the one or more machine learning models, to determine the output data, are to:
process the record, with one of the one or more machine learning models, to determine a readability score for the legal regulation as a function of one or more lengths of sentences and a use of complex words in the legal regulation; and
determine the data indicating the complexity of the legal regulation based on the readability score.

13. The device of claim 8, wherein the one or more processors, when processing the record, with the one or more machine learning models, to determine the output data, are to:
identify the data indicating the misrepresentation in the legal regulation based on:
how similar phrases in the legal regulation have potential for misinterpretation, and
a linguistic analysis of a grouping of words in the legal regulation that do not correlate.

14. The device of claim 8, wherein the one or more processors, when performing the one or more actions based on the output data, are to one or more of:
provide, to a client device, the output data via an interactive user interface that includes a dashboard and a search functionality;
assign a task associated with the legal regulation and based on the output data; or
generate, based on the output data, a custom survey campaign for the legal regulation.

15. A non-transitory computer-readable medium storing instructions, the instructions comprising:
one or more instructions that, when executed by one or more processors, cause the one or more processors to:
receive input data associated with a legal regulation;
process the input data to generate a regulation analytical record that includes one or more of:
the input data in a knowledge representation format,
the input data in a semantic representation format,
data identifying a feature associated with the input data,
data identifying an industry classification associated with the input data, or
data identifying an entity of interest associated with the input data;
determine, based on one or more machine learning models, a similarity index associated with the input data;
determine, based on the one or more machine learning models, whether the similarity index satisfies a threshold;
map, based on determining whether the similarity index satisfies the threshold, input data to one or more sectors,
wherein the similarity index is based on semantic similarity scores;
process the regulation analytical record, with the one or more machine learning models and based on the mapping, to determine output data that includes one or more of:
data indicating that the legal regulation is inconsistent,
data indicating that the legal regulation is outdated,
data indicating a sentiment for the legal regulation,
data indicating a prescriptive nature of the legal regulation,
data indicating a complexity of the legal regulation,
data indicating a misrepresentation in the legal regulation, data indicating a compliance burden associated with the legal regulation, or data indicating an industry performance impact of the legal regulation;

perform one or more actions based on the output data, wherein the one or more actions include one or more of:

providing, to a client device, the output data via an interactive user interface that includes a dashboard and a search functionality, assigning a task associated with the legal regulation and based on the output data, or generating, based on the output data, a custom survey campaign for the legal regulation;

identify, based on the one or more machine learning models, predetermined outdated terms;

determine, based on incorporating contextual analysis and based on identifying the predetermined outdated terms, scores associated with specific regulations and respective phrases;

identify, based on the determined scores, an outdated set of regulations that requires updates, wherein the outdated set of regulations is identified from a group of regulations that include the legal regulation;

provide, based on identifying the outdated set of regulations and based on the one or more machine learning models, a ranked set of the outdated set of regulations; and update, via a feedback loop, and based on the output data, the one or more machine learning models to enhance accuracy of the one or more machine learning models.

16. The non-transitory computer-readable medium of claim 15, wherein the one or more instructions, that cause the one or more processors to process the input data, to generate the regulation analytical record, cause the one or more processors to:

identify, in the input data, regulation components that describe the legal regulation; and generate the input data in the knowledge representation format based on combining the regulation components.

17. The non-transitory computer-readable medium of claim 15, wherein the one or more instructions, that cause the one or more processors to process the regulation analytical record, with the one or more machine learning models, to determine the output data, cause the one or more processors to:

process the regulation analytical record, with multiple unsupervised machine learning models of the one or more machine learning models, to determine the data indicating that the legal regulation is inconsistent, wherein the multiple unsupervised machine learning models include:

a first latent semantic indexing (LSI) model with a first predetermined threshold, a second LSI model with a second predetermined threshold, and a density-based spatial clustering of applications with noise model.

18. The non-transitory computer-readable medium of claim 15, wherein the one or more instructions, that cause the one or more processors to process the regulation analytical record, with the one or more machine learning models, to determine the output data, cause the one or more processors to:

select a particular machine learning model from the one or more machine learning models based on a problem statement; and process the regulation analytical record, with the particular machine learning model, to generate the data indicating that the legal regulation is outdated.

19. The non-transitory computer-readable medium of claim 15, wherein the one or more instructions, that cause the one or more processors to process the regulation analytical record, with the one or more machine learning models, to determine the output data, cause the one or more processors to:

determine the data indicating the prescriptive nature of the legal regulation based on semantic characteristics of the input data, the data identifying the feature associated with the input data, and a similarity criterion.

20. The non-transitory computer-readable medium of claim 15, wherein the one or more instructions, that cause the one or more processors to process the regulation analytical record, with the one or more machine learning models, to determine the output data, cause the one or more processors to:

process the regulation analytical record, with one of the one or more machine learning models, to determine a readability score for the legal regulation as a function of one or more lengths of sentences and a use of complex words in the legal regulation; and determine the data indicating the complexity of the legal regulation based on the readability score.

* * * * *